US012605746B2

(12) United States Patent
Hodge et al.

(10) Patent No.: US 12,605,746 B2
(45) **Date of Patent: *Apr. 21, 2026**

(54) REDUCED MISTING AND CLINGING CHLORINE BASED HARD SURFACE CLEANER

(71) Applicant: ECOLAB USA INC., Saint Paul, MN (US)

(72) Inventors: Charles Allen Hodge, Saint Paul, MN (US); Christopher Michael McGuirk, Saint Paul, MN (US); Amanda Ruth Blattner, Saint Paul, MN (US); Claire Lucille Notermann, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 839 days.

This patent is subject to a terminal disclaimer.

(21) Appl. No.: 17/659,441

(22) Filed: Apr. 15, 2022

(65) Prior Publication Data

US 2022/0234081 A1 Jul. 28, 2022

Related U.S. Application Data

(63) Continuation of application No. 16/948,704, filed on Sep. 29, 2020, now Pat. No. 11,331,696, which is a (Continued)

(51) Int. Cl.
*B08B 3/04* (2006.01)
*B08B 1/14* (2024.01)
(Continued)

(52) U.S. Cl.
CPC ................ *B08B 3/08* (2013.01); *B08B 1/143* (2024.01); *B08B 3/003* (2013.01); *C11D 1/04* (2013.01);
(Continued)

(58) Field of Classification Search
CPC .... B08B 3/08; B08B 3/04; C11D 1/00; C11D 1/04; C11D 1/143; C11D 1/75;
(Continued)

(56) References Cited

U.S. PATENT DOCUMENTS 3,296,145 A 1/1967 Findlan et al.
3,560,389 A 2/1971 Hunting
(Continued)

FOREIGN PATENT DOCUMENTS

BG 65638 B1 4/2009
CA 1199808 A 1/1986
(Continued)

OTHER PUBLICATIONS

Bozetine et al., "Optimization of an Alkylpolyglucoside-Based Dishwashing Detergent Formulation," Journal of Surfactants and Detergents, Dec. 2008, vol. 11, pp. 299-305.
(Continued)

*Primary Examiner* — Brian P Mruk
(74) *Attorney, Agent, or Firm* — McKee, Voorhees & Sease, PLC

(57) ABSTRACT

Alkaline sprayable aqueous compositions are disclosed. In particular, sprayable alkaline aqueous chlorine compositions including a surfactant system for modifying the viscosity of the composition, are combined with an alkalinity source and a chlorine source. Methods of cleaning having reduced amounts of airborne particulates of the composition during spray applications are also provided according to the invention, namely reduction of airborne particulates having a micron size of 10 or less within a breathing zone of a user of less than or equal to 60 particles/$cm^3$.

14 Claims, 10 Drawing Sheets

Related U.S. Application Data continuation of application No. 16/246,135, filed on Jan. 11, 2019, now Pat. No. 10,821,484, which is a continuation of application No. 15/447,891, filed on Mar. 2, 2017, now Pat. No. 10,220,421, which is a continuation of application No. 14/180,454, filed on Feb. 14, 2014, now Pat. No. 9,637,708.

(51) Int. Cl.

| | |
|---|---|
| ***B08B 3/00*** | (2006.01) |
| ***B08B 3/08*** | (2006.01) |
| ***C11D 1/04*** | (2006.01) |
| ***C11D 1/12*** | (2006.01) |
| ***C11D 1/14*** | (2006.01) |
| ***C11D 1/75*** | (2006.01) |
| ***C11D 1/83*** | (2006.01) |
| ***C11D 3/04*** | (2006.01) |
| ***C11D 3/395*** | (2006.01) |
| *B05B 11/10* | (2023.01) |

(52) U.S. Cl.
CPC ................ *C11D 1/143* (2013.01); *C11D 1/75* (2013.01); *C11D 1/83* (2013.01); *C11D 3/04* (2013.01); *C11D 3/044* (2013.01); *C11D 3/3956* (2013.01); *B05B 11/1011* (2023.01)

(58) Field of Classification Search
CPC .. C11D 3/04; C11D 1/12; C11D 1/665; C11D 1/83; C11D 3/044; C11D 3/3932; C11D 17/041
See application file for complete search history.

(56) References Cited

U.S. PATENT DOCUMENTS

| | | | | |
|---|---|---|---|---|
| 3,658,988 | A | 4/1972 | Scher | |
| 3,684,722 | A | 8/1972 | Hynam et al. | |
| 3,929,678 | A | 12/1975 | Laughlin et al. | |
| 4,046,741 | A | 9/1977 | Scher | |
| 4,071,463 | A | 1/1978 | Steinhauer | |
| 4,140,516 | A | 2/1979 | Scher | |
| 4,223,070 | A | 9/1980 | Hahn et al. | |
| 4,229,313 | A | 10/1980 | Joy | |
| 4,282,109 | A | 8/1981 | Citrone et al. | |
| 4,314,841 | A | 2/1982 | Scher | |
| 4,337,163 | A | 6/1982 | Schilp | |
| 4,357,351 | A | 11/1982 | Fancher et al. | |
| 4,388,204 | A | 6/1983 | Dimond et al. | |
| 4,390,448 | A | 6/1983 | Boden et al. | |
| 4,399,050 | A | 8/1983 | Bentham et al. | |
| 4,425,241 | A | 1/1984 | Swanson | |
| 4,440,563 | A | 4/1984 | Scher | |
| 4,500,494 | A | 2/1985 | Scher | |
| 4,510,081 | A | 4/1985 | Bronner et al. | |
| 4,515,813 | A | 5/1985 | Fancher et al. | |
| 4,538,745 | A | 9/1985 | Dunning | |
| 4,576,728 | A | 3/1986 | Stoddart | |
| 4,585,570 | A | 4/1986 | Nelson | |
| 4,646,973 | A | 3/1987 | Focaracci | |
| 4,673,704 | A | 6/1987 | Flesher et al. | |
| 4,778,836 | A | 10/1988 | Farrar et al. | |
| 4,783,283 | A * | 11/1988 | Stoddart | C11D 1/75 510/427 |
| 4,789,495 | A | 12/1988 | Cahall et al. | |
| 4,800,036 | A | 1/1989 | Rose et al. | |
| 4,839,079 | A | 6/1989 | Wainberg et al. | |
| 4,842,771 | A | 6/1989 | Roerig et al. | |
| 4,853,146 | A | 8/1989 | Roerig et al. | |
| 4,898,611 | A | 2/1990 | Gross | |
| 4,900,467 | A | 2/1990 | Smith | |
| 4,929,655 | A | 5/1990 | Takeda et al. | |
| 4,933,167 | A | 6/1990 | Scher et al. | |
| 4,956,129 | A | 9/1990 | Scher et al. | |
| 4,992,195 | A | 2/1991 | Dolan et al. | |
| 5,011,538 | A | 4/1991 | Smith | |
| 5,041,239 | A | 8/1991 | Roerig et al. | |
| 5,055,219 | A | 10/1991 | Smith | |
| 5,078,896 | A | 1/1992 | Rorig et al. | |
| 5,120,542 | A | 6/1992 | Scher et al. | |
| 5,134,961 | A | 8/1992 | Giles et al. | |
| 5,160,529 | A | 11/1992 | Scher et al. | |
| 5,225,096 | A | 7/1993 | Ahmed et al. | |
| 5,232,621 | A | 8/1993 | Dixit et al. | |
| 5,252,242 | A | 10/1993 | Shevade et al. | |
| 5,332,584 | A | 7/1994 | Scher et al. | |
| 5,336,426 | A | 8/1994 | Rader et al. | |
| 5,348,682 | A | 9/1994 | Finley et al. | |
| 5,364,551 | A | 11/1994 | Lentsch et al. | |
| 5,368,766 | A | 11/1994 | Dixit | |
| 5,389,157 | A | 2/1995 | Smith | |
| 5,395,547 | A | 3/1995 | Broadwell et al. | |
| 5,454,984 | A | 10/1995 | Graubart et al. | |
| 5,462,689 | A | 10/1995 | Choy et al. | |
| 5,562,914 | A | 10/1996 | Scher et al. | |
| 5,728,665 | A | 3/1998 | Choy et al. | |
| 5,804,545 | A | 9/1998 | Hemling et al. | |
| 5,814,683 | A | 9/1998 | Branham | |
| 5,883,059 | A * | 3/1999 | Furman | A61K 8/44 510/159 |
| 5,912,207 | A | 6/1999 | Scher et al. | |
| 5,916,859 | A | 6/1999 | Choy et al. | |
| 6,046,152 | A | 4/2000 | Vinson et al. | |
| 6,100,228 | A * | 8/2000 | Argo | C11D 17/003 510/383 |
| 6,268,324 | B1 | 7/2001 | Besse et al. | |
| 6,303,564 | B1 | 10/2001 | Littau et al. | |
| 6,485,736 | B1 | 11/2002 | Shirley et al. | |
| 6,541,422 | B2 | 4/2003 | Scher et al. | |
| 6,544,540 | B2 | 4/2003 | Van Koppenhagen et al. | |
| 6,750,190 | B2 | 6/2004 | Colurciello et al. | |
| 6,866,888 | B2 * | 3/2005 | Baker | A47L 23/205 15/302 |
| 7,271,200 | B2 | 9/2007 | Scher et al. | |
| 7,278,294 | B2 | 10/2007 | Giles et al. | |
| 7,311,004 | B2 | 12/2007 | Giles | |
| 7,390,775 | B2 * | 6/2008 | Rees | C11D 3/3956 510/237 |
| 7,502,665 | B2 | 3/2009 | Giles et al. | |
| 7,566,448 | B2 | 7/2009 | Becker et al. | |
| 7,665,348 | B2 | 2/2010 | Giles | |
| 7,742,842 | B2 | 6/2010 | Giles et al. | |
| 7,826,930 | B2 | 11/2010 | Giles et al. | |
| 8,109,448 | B2 | 2/2012 | Giles | |
| 8,173,159 | B2 | 5/2012 | Scher et al. | |
| 8,250,907 | B2 | 8/2012 | Giles | |
| 9,637,708 | B2 * | 5/2017 | Hodge | C11D 3/04 |
| 10,220,421 | B2 * | 3/2019 | Hodge | B08B 3/003 |
| 10,821,484 | B2 * | 11/2020 | Hodge | B08B 1/143 |
| 11,331,696 | B2 * | 5/2022 | Hodge | C11D 3/04 |
| 2002/0037306 | A1 | 3/2002 | Van Koppenhagen et al. | |
| 2004/0076909 | A1 | 4/2004 | Shirley et al. | |
| 2004/0121932 | A1 * | 6/2004 | Griese | C11D 3/222 510/417 |
| 2004/0138079 | A1 | 7/2004 | Becker et al. | |
| 2004/0197357 | A1 | 10/2004 | Heming et al. | |
| 2004/0224867 | A1 | 11/2004 | Colurciello et al. | |
| 2007/0043119 | A1 | 2/2007 | Graeber et al. | |
| 2007/0093401 | A1 | 4/2007 | Murthy et al. | |
| 2007/0264344 | A1 | 11/2007 | Segura-Orsoni et al. | |
| 2008/0230624 | A1 | 9/2008 | Giles et al. | |
| 2009/0148342 | A1 * | 6/2009 | Bromberg | C11D 3/48 424/661 |
| 2010/0249199 | A1 * | 9/2010 | Perry | A01N 59/00 514/394 |
| 2010/0255121 | A1 | 10/2010 | Perry | |
| 2010/0286019 | A1 | 11/2010 | Scher et al. | |
| 2011/0271979 | A1 | 11/2011 | Mondin et al. | |
| 2012/0168532 | A1 | 7/2012 | Giles | |
| 2013/0255729 | A1 | 10/2013 | Hodge et al. | |
| 2013/0284205 | A1 | 10/2013 | Hodge et al. | |

(56) References Cited

U.S. PATENT DOCUMENTS

FOREIGN PATENT DOCUMENTS

| | | | | | |
|---|---|---|---|---|---|
| CA | 1317875 | C | | 5/1993 | |
| CA | 2122956 | A1 | | 11/1994 | |
| CA | 2276364 | A1 | | 7/1998 | |
| CA | 2339013 | A1 | | 2/2000 | |
| CA | 2101641 | C | | 2/2001 | |
| CA | 2376679 | A1 | | 3/2001 | |
| CA | 2405977 | A1 | | 12/2001 | |
| CA | 2245537 | C | | 10/2006 | |
| CA | 2512324 | A1 | | 1/2007 | |
| EP | 0085327 | A1 | | 8/1983 | |
| EP | 0110544 | A1 | | 6/1984 | |
| EP | 0129980 | A1 | | 1/1985 | |
| EP | 0145084 | A2 | | 6/1985 | |
| EP | 0274885 | A1 | | 7/1988 | |
| EP | 0411218 | A1 | | 2/1991 | |
| EP | 0623052 | B1 | | 9/1996 | |
| EP | 842604 | A1 | * | 5/1998 | ............ A01N 59/00 |
| EP | 842605 | A1 | * | 5/1998 | ............ A01N 59/00 |
| EP | 0842606 | A1 | * | 5/1998 | |
| JP | H09296121 | A | | 11/1997 | |
| WO | 8002024 | A1 | | 10/1980 | |
| WO | 9314865 | A1 | | 8/1993 | |
| WO | 9707675 | A1 | | 3/1997 | |
| WO | 9727748 | A1 | | 8/1997 | |
| WO | 9828975 | A1 | | 7/1998 | |
| WO | 0005951 | A1 | | 2/2000 | |
| WO | 0005952 | A1 | | 2/2000 | |
| WO | 0119509 | A1 | | 3/2001 | |
| WO | 2013064315 | A1 | | 5/2013 | |

OTHER PUBLICATIONS

Brüschweiler, H., "Flüssigwaschmittel," Tenside Detergents, 1986, vol. 23, No. 1, pp. 7-12.

Crowe et al., "Digital Device and Technique for Sensing Distribution of Spray Deposition," American Society of Agricultural Engineers, 2005, vol. 48, No. 6, pp. 2085-2093.

Dexter, R. W., "Measurement of Extensional Viscosity of Polymer Solutions and Its Effects on Atomization from a Spray Nozzle," Atomization and Sprays, 1996, vol. 6, pp. 167-191.

Filipović-Vincekovič et al., "Surfactants in Liquid Decontamination Processes," Tenside Surfactants Detergents, 1987, vol. 24, No. 3, pp. 167-172.

Giles et al., "Flow Control and Spray Cloud Dynamics from Hydraulic Atomizers," American Society of Agricultural Engineers, 2002, vol. 45, No. 3, pp. 539-554.

Giles et al., "Precision Band Spraying with Machine-Vision Guidance and Adjustable Yaw Nozzles," American Society of Agricultural Engineers, vol. 40, No. 1, pp. 29-36.

Giles et al., "Suppression of Aerosol Generation During Spraying and Deposition of Consumer Products," Atomization and Sprays, 2005, vol. 15, pp. 423-438.

Giles et al., "Transient Droplet Size Spectra from Trigger Sprayers Dispensing Aqueous Solutions," American Society of Agricultural Engineers, 2005, vol. 48, No. 1, pp. 63-72.

Giles, D. K., "Independent Control of Liquid Flow Rate and Spray Droplet Size from Hydraulic Atomizers," Atomization and Sprays, 1997, vol. 7, pp. 161-181.

International Search Report and Written Opinion in PCT/US2015/015453, mailed May 29, 2015, 11 pages.

Jadidi et al., "Synergism and Performance Optimization in Liquid Detergents Containing Binary Mixtures of Anionic-Nonionic, and Anionic-Cationic Surfactants," Journal of Surfactants and Detergents, 2013, vol. 16, pp. 115-121.

Malihi et al., "Evaluation of Physico-Chemical Interactions between Linear Alkylbenzene Sulfonate (LAS) and Alcohol Ethoxylates," Tenside Surfactants Detergents, 2011, vol. 48, No. 5, pp. 395-399.

Raney, K. H., "Optimization of Nonionic/Anionic Surfactant Blends for Enhanced Oily Soil Removal," Journal of the American Oil Chemists' Society, Jul. 1991, vol. 58, No. 7, pp. 525-531.

Rojvoranun et al., "Mechanistic Studies of Particulate Soil Detergency: I. Hydrophobic Soil Removal," Journal of Surfactants and Detergents, 2012, vol. 15, pp. 277-289.

Rojvoranun et al., "Mechanistic Studies of Particulate Soil Detergency: II. Hydrophilic Soil Removal," Journal of Surfactants and Detergents, 2012, vol. 15, pp. 663-677.

Zaïd et al., "Response Surface Methodology as an Approach to the Optimization of a Dishwashing Detergent," Tenside Surfactants Detergents, 2007, vol. 44, No. 2, pp. 94-101.

* cited by examiner

| | Control | Sample 1 | Sample 2 | Sample 3 | Sample 4 | 1 | 2a | 2b | 2c | 2d | 2e | 2f | 2g | 2h | 3a | 3b | 3c |
|---|---|---|---|---|---|---|---|---|---|---|---|---|---|---|---|---|---|
| Deionized Water | 72.575 | 67.06 | 61.08 | 58.1 | 55.11 | 58.1 | 66.78 | 67.15 | 60.66 | 61.22 | 57.62 | 58.26 | 54.56 | 55.3 | 71.77 | 68.17 | 66.36 |
| NAS-FAL | 5.625 | | | | | | | | | | | | | | | | |
| Barlox 12 | 0.45 | | | | | | | | | | | | | | | | |
| Barlox 16S (6%) | | 11.11 | 16.67 | 19.44 | 22.22 | 19.44 | 11.11 | 11.11 | 16.67 | 16.67 | 19.44 | 19.44 | 22.22 | 22.22 | 5.56 | 8.33 | 9.72 |
| Surtech SC-45 (40%) | | 0.83 | 1.25 | 1.46 | 1.67 | | | | | | | | | | 1.67 | 2.5 | 2.92 |
| Dowfax 3B2 | 0.75 | | | | | | | | | | | | | | | | |
| NaOH (50%) | 0.6 | 1 | 1 | 1 | 1 | 1 | 1 | 1 | 1 | 1 | 1 | 1 | 1 | 1 | 1 | 1 | 1 |
| NaOCl (10%) | 20 | 20 | 20 | 20 | 20 | 20 | 20 | 20 | 20 | 20 | 20 | 20 | 20 | 20 | 20 | 20 | 20 |
| SXS (40%) | | | | | | 1.46 | | | | | | | | | | | |
| SAS (30%) | | | | | | | 1.11 | | 1.67 | | 1.94 | | 2.22 | | | | |
| Colatrope (45%) | | | | | | | | 0.74 | | 1.11 | | 1.3 | | 1.48 | | | |
| Fragrance | | | | | | | | | | | | | | | | | |
| Total | 100 | 100 | 100 | 100 | 100 | 100 | 100 | 100 | 100 | 100 | 100 | 100 | 100 | 100 | 100 | 100 | 100 |
| Active Surfactant | - | 1 | 1.5 | 1.75 | 2 | 1.75 | 1 | 1 | 1.5 | 1.5 | 1.75 | 1.75 | 2 | 2 | 1 | 1.5 | 1.75 |
| Barlox 16S: Co-Surfactant Actives Ratio | - | 2:1 | 2:1 | 2:1 | 2:1 | 2:1 | 2:1 | 2:1 | 2:1 | 2:1 | 2:1 | 2:1 | 2:1 | 2:1 | 1:2 | 1:2 | 1:2 |

Fig. 10A

| | 3d | 3e | 3f | 3g | 3h | 3i | 3j | 3k | 3l | 3m | 3n | 3o | 3p | 3q | 3r | 3s | 3t |
|---|---|---|---|---|---|---|---|---|---|---|---|---|---|---|---|---|---|
| Deionized Water | 64.56 | 69.42 | 64.63 | 62.23 | 59.83 | 72.95 | 69.94 | 68.43 | 66.92 | 65.87 | 59.31 | 56.03 | 52.75 | 65.2 | 58.25 | 54.825 | 51.33 |
| NAS-FAL | | | | | | | | | | | | | | | | | |
| Barlox 12 | | | | | | | | | | | | | | | | | |
| Barlox 16S (6%) | 11.11 | 8.33 | 12.5 | 14.58 | 16.67 | 4.17 | 6.25 | 7.29 | 8.33 | 12.5 | 18.75 | 21.88 | 25 | 13.3 | 20 | 23.3 | 26.67 |
| Surtech SC-45 (40%) | 3.33 | 1.25 | 1.88 | 2.19 | 2.5 | 1.88 | 2.81 | 3.28 | 3.75 | 0.63 | 0.94 | 1.09 | 1.25 | 0.5 | 0.75 | 0.875 | 1 |
| Dowfax 3B2 | | | | | | | | | | | | | | | | | |
| NaOH (50%) | 1 | 1 | 1 | 1 | 1 | 1 | 1 | 1 | 1 | 1 | 1 | 1 | 1 | 1 | 1 | 1 | 1 |
| NaOCl (10%) | 20 | 20 | 20 | 20 | 20 | 20 | 20 | 20 | 20 | 20 | 20 | 20 | 20 | 20 | 20 | 20 | 20 |
| SXS (40%) | | | | | | | | | | | | | | | | | |
| SAS (30%) | | | | | | | | | | | | | | | | | |
| Colatrope (45%) | | | | | | | | | | | | | | | | | |
| Fragrance | | | | | | | | | | | | | | | | | |
| Total | 100 | 100 | 100 | 100 | 100 | 100 | 100 | 100 | 100 | 100 | 100 | 100 | 100 | 100 | 100 | 100 | 100 |
| Active Surfactant | 2 | 1 | 1.5 | 1.75 | 2 | 1 | 1.5 | 1.75 | 2 | 1 | 1.5 | 1.75 | 2 | 1 | 1.5 | 1.75 | 2 |
| Barlox 16S: Co-Surfactant Actives Ratio | 1:2 | 1:1 | 1:1 | 1:1 | 1:1 | 1:3 | 1:3 | 1:3 | 1:3 | 3:1 | 3:1 | 3:1 | 3:1 | 4:1 | 4:1 | 4:1 | 4:1 |

Fig.10B

REDUCED MISTING AND CLINGING CHLORINE BASED HARD SURFACE CLEANER

CROSS-REFERENCE TO RELATED APPLICATIONS

This application is a Continuation application of U.S. Ser. No. 16/948,704, filed Sep. 29, 2020, which is a Continuation application of U.S. Ser. No. 16/246,135, filed Jan. 11, 2019, now U.S. Pat. No. 10,821,484, issued Nov. 3, 2020, which is a Continuation application of U.S. Ser. No. 15/447,891, filed Mar. 2, 2017, now U.S. Pat. No. 10,220,421, issued Mar. 5, 2019, which is a Continuation application of U.S. Ser. No. 14/180,454, filed Feb. 14, 2014, now U.S. Pat. No. 9,637,708, issued May 2, 2017, which are herein incorporated by reference in their entirety.

FIELD OF THE INVENTION

The present invention is related to the field of sprayable aqueous compositions. The present invention is further related to sprayable aqueous chlorine compositions including a surfactant system for modifying the viscosity of the composition. In particular, the present invention provides compositions and methods of cleaning having reduced amounts of airborne particles of the composition during spray applications. The sprayable aqueous compositions according to the invention have reduced misting providing benefits of reduced inhalation.

BACKGROUND OF THE INVENTION

Aqueous cleaning compositions, such as chlorine based cleaners, can be applied to hard surface with a transient trigger spray device, an aerosol spray device or a foaming spray device. These cleaners have great utility because they can be applied to vertical, overhead or inclined surfaces. Spray devices create a spray pattern of the composition that contacts the target hard surface. The majority of the composition comes to reside on the target surface, while a small portion of the sprayable composition may become an airborne aerosol or mist consisting of small particles (e.g. an airborne mist or finely divided aerosol) of the cleaning composition that can remain suspended or dispersed in the atmosphere surrounding the dispersal site for a period of time, such as between about 5 seconds to about 10 minutes.

Accordingly, it is an objective of the claimed invention to develop compositions having reduced misting, anti-mist and/or particle size control for chlorine-based hard surface cleaners.

A further object of the invention is a reduced misting product to reduce and/or eliminate exposure to users of the cleaning composition to mist or other small particles generated by the spraying of the cleaning composition.

A still further object of the invention is to provide methods of cleaning using a chlorine-based, ready-to-use cleaning composition for hard surfaces that reduces the amount of mist or other small particles generated by the spraying of the composition.

Other objects, advantages and features of the present invention will become apparent from the following specification taken in conjunction with the accompanying drawings.

BRIEF SUMMARY OF THE INVENTION

An advantage of the invention is provided by a chlorine-based hard surface cleaner having significantly reduced misting (i.e. particle control) when spraying the product.

In an embodiment, the present invention provides ready-to-use (RTU) sprayable, chlorine-based cleaning compositions. In an aspect, the present invention provides cleaning compositions comprising from about 50 wt-% and about 99 wt-% water, at least one alkali metal hypochlorite present in an amount between about 0.1 wt-% and about 35 wt-%, from about 0.1 wt-% and about 10 wt-% an alkali metal alkalinity source, and from about 1.5% actives or greater of a surfactant system. In an aspect the surfactant system comprises a first surfactant, a second surfactant and a third surfactant, wherein the first surfactant is an alkyl amine oxide, the second surfactant is a $C_8$-$C_{20}$ alkane sulfonate, and the third surfactant is a $C_8$-$C_{12}$, carboxylate.

In a further embodiment, the present invention provides a system for applying a chlorine based product, the system comprising a sprayer comprising a spray head connected to a spray bottle; and an aqueous, ready-to-use chlorine-based solution contained by the spray bottle and the spray head adapted to dispense the aqueous solution. In an aspect the aqueous solution comprises an alkali metal hypochlorite, an alkali metal alkalinity source, a surfactant system comprising a tertiary alkyl amine oxide, a $C_8$-$C_{20}$ alkyl sulfonate and a C8-C12 carboxylate. In a further aspect the surfactant system is present in a total amount of at least about 1.5% actives of the aqueous solution. In a further aspect, the chlorine-based solution produces a total concentration of misting of particles less than about 10 microns in size within a breathing zone of a user of less than or equal to 60 particles/$cm^3$.

In a still further embodiment, the present invention provides methods for cleaning a hard surface. In an aspect, the method comprises applying an aqueous, ready-to-use, chlorine-based cleaning composition to a hard surface with a trigger sprayer. In an aspect, the method further comprises wiping the hard surface to remove the aqueous, ready-to-use, chloride-based cleaning composition.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 10A and FIG. 10B show formulations in weight percentage evaluated according to embodiments of the invention for reduced misting as set forth in Examples 4-5.

Figure 1:
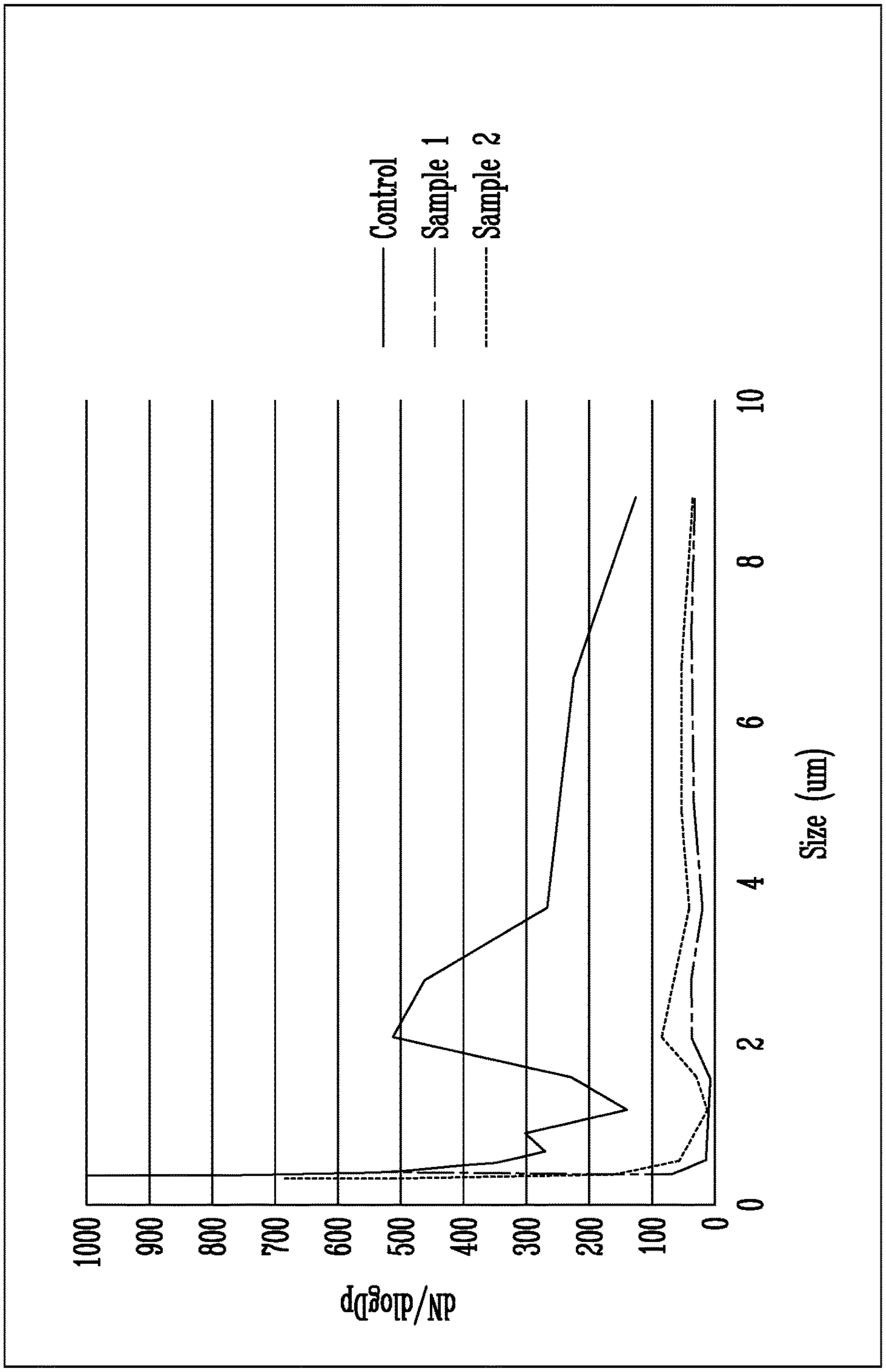
FIG. 1 shows concentration of misting in control and various formulations (Control, Sample 1 and Sample 2) evaluated according to embodiments of the invention as set forth in Example 4.
Figure 2:
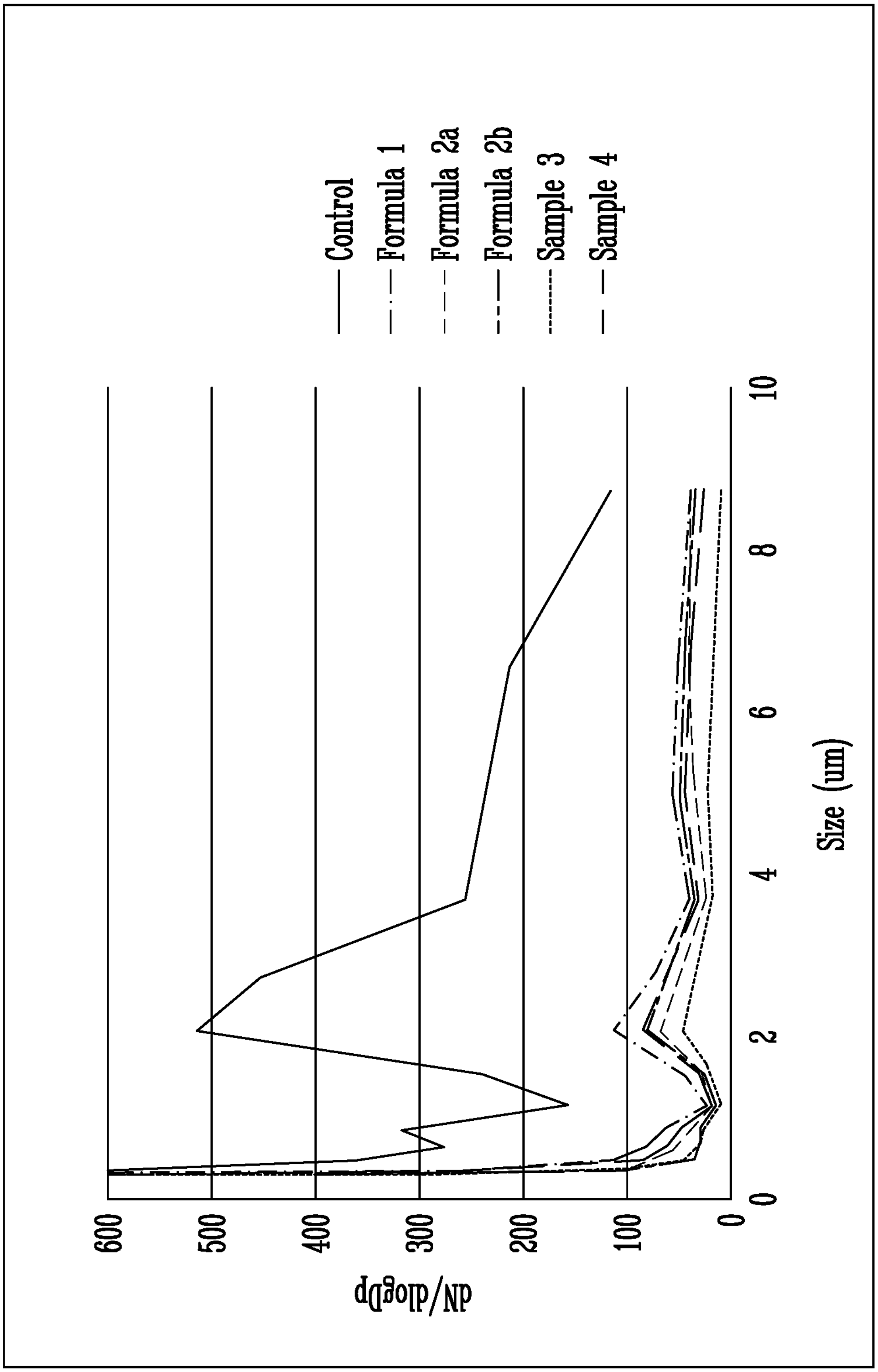
FIG. 2 shows concentration of misting in control and various formulations (Formula 1, Formula 2a, Formula 2b, Sample 3, and Sample 4) evaluated according to embodiments of the invention as set forth in Example 4.
Figure 3:
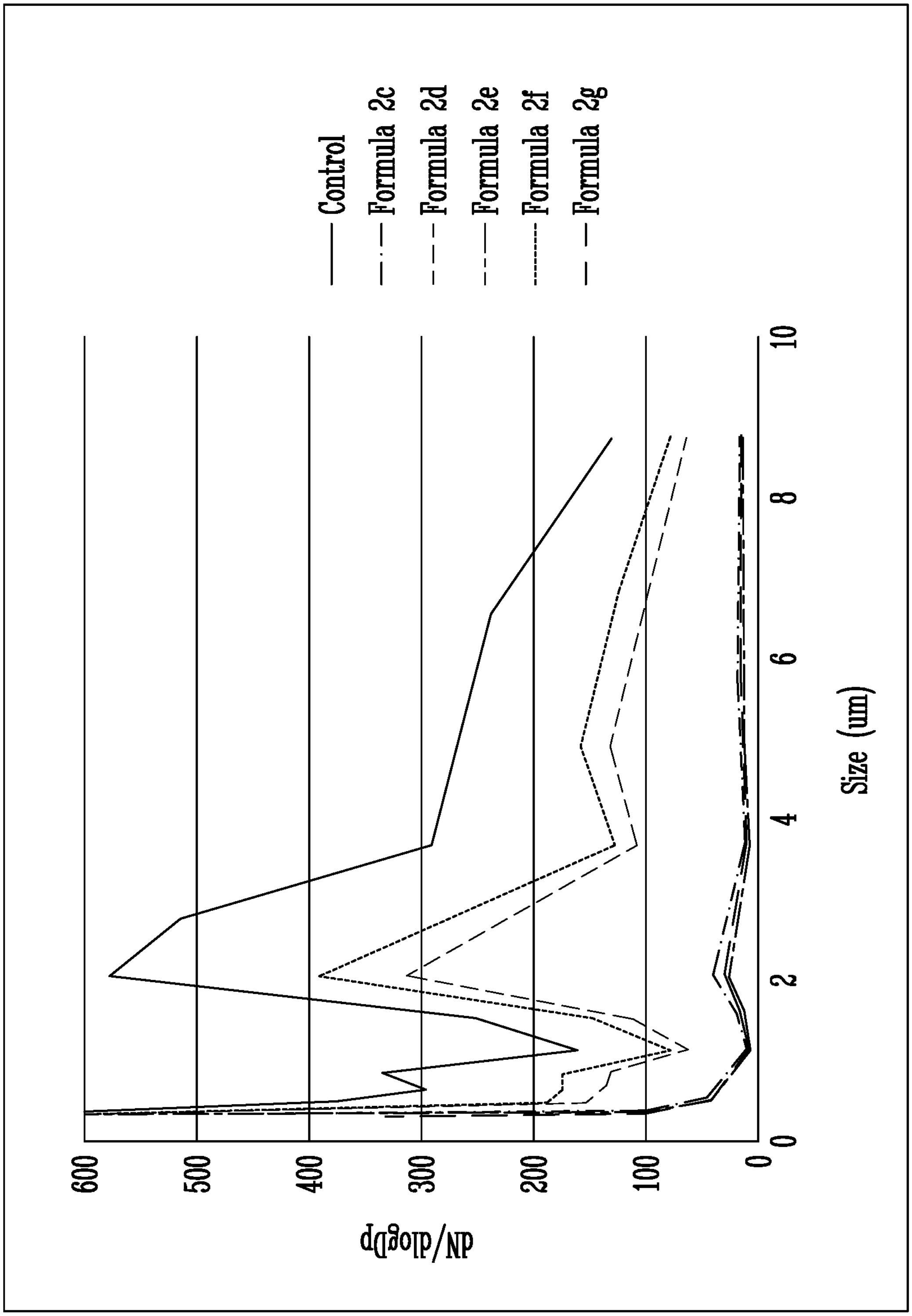
FIG. 3 shows concentration of misting in control and various formulations (Formula 2c, Formula 2d, Formula 2e, Formula 2f, Formula 2g) evaluated according to embodiments of the invention as set forth in Example 4.
Figure 4:
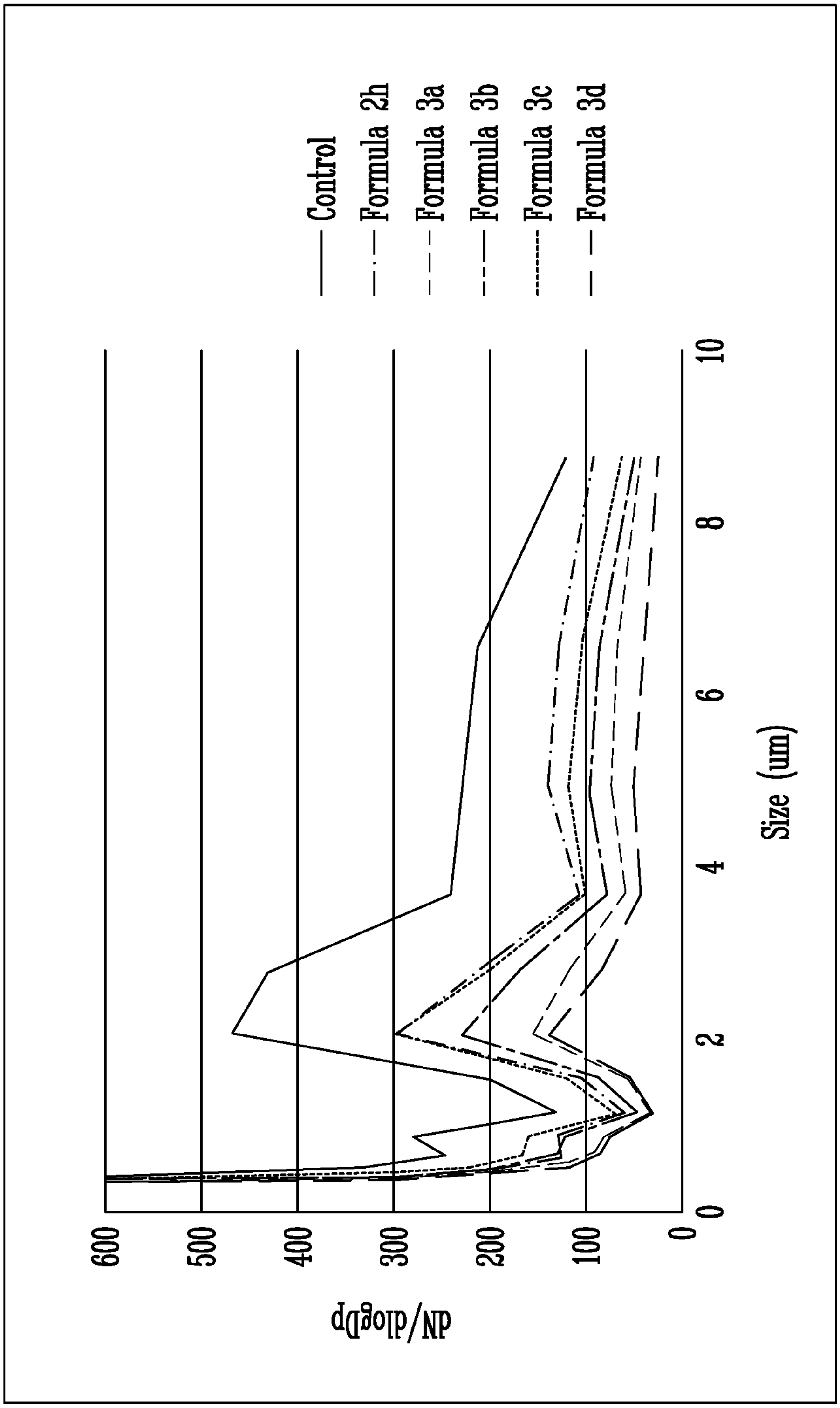
FIG. 4 shows concentration of misting in control and various formulations (Formula 2h, Formula 3a, Formula 3b, Formula 3c, Formula 3d) evaluated according to embodiments of the invention as set forth in Example 4.
Figure 5:
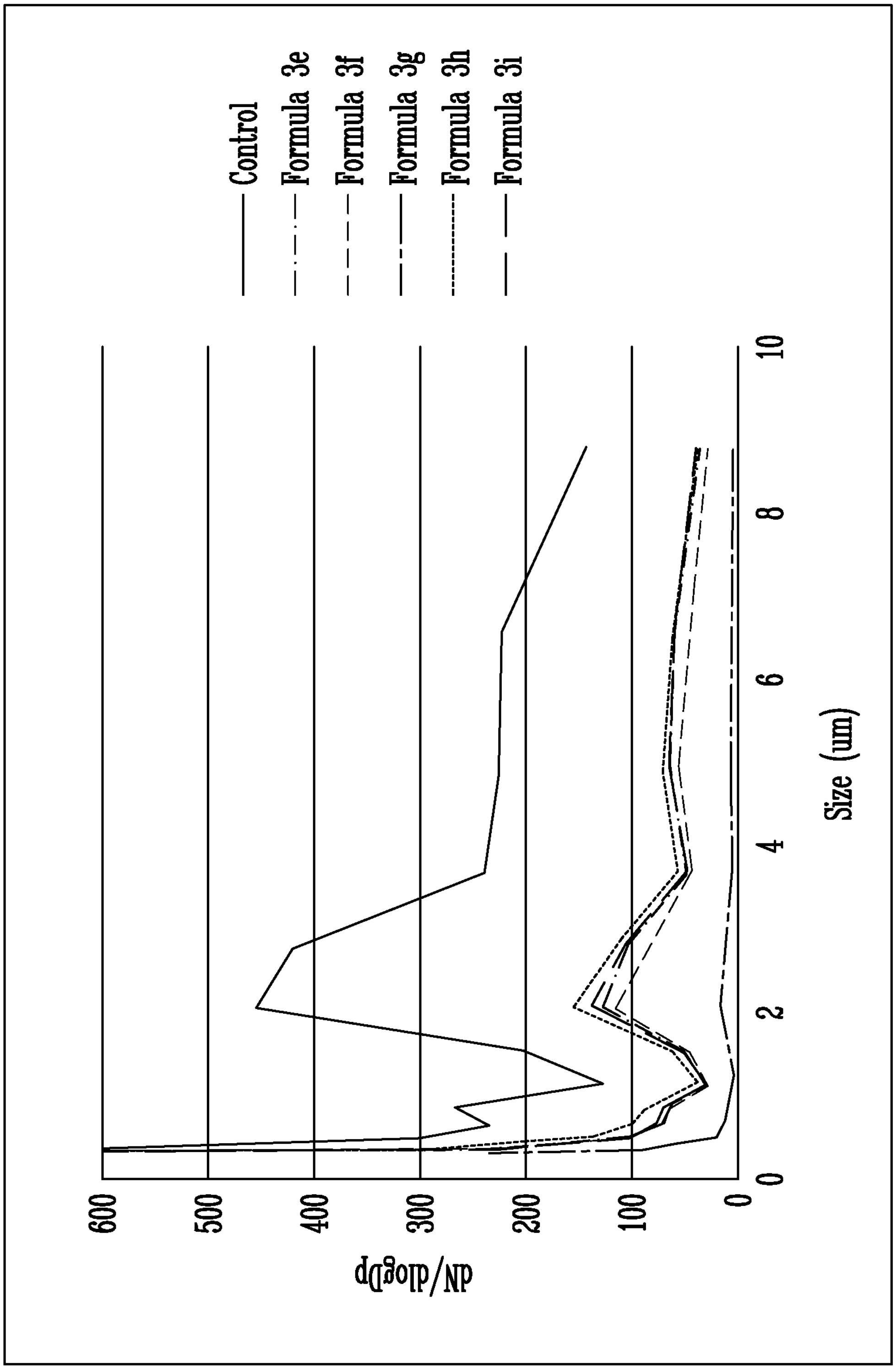
FIG. 5 shows concentration of misting in control and various formulations (Formula 3e, Formula 3f, Formula 3g, Formula 3h, Formula 3i) evaluated according to embodiments of the invention as set forth in Example 4.
Figure 6:
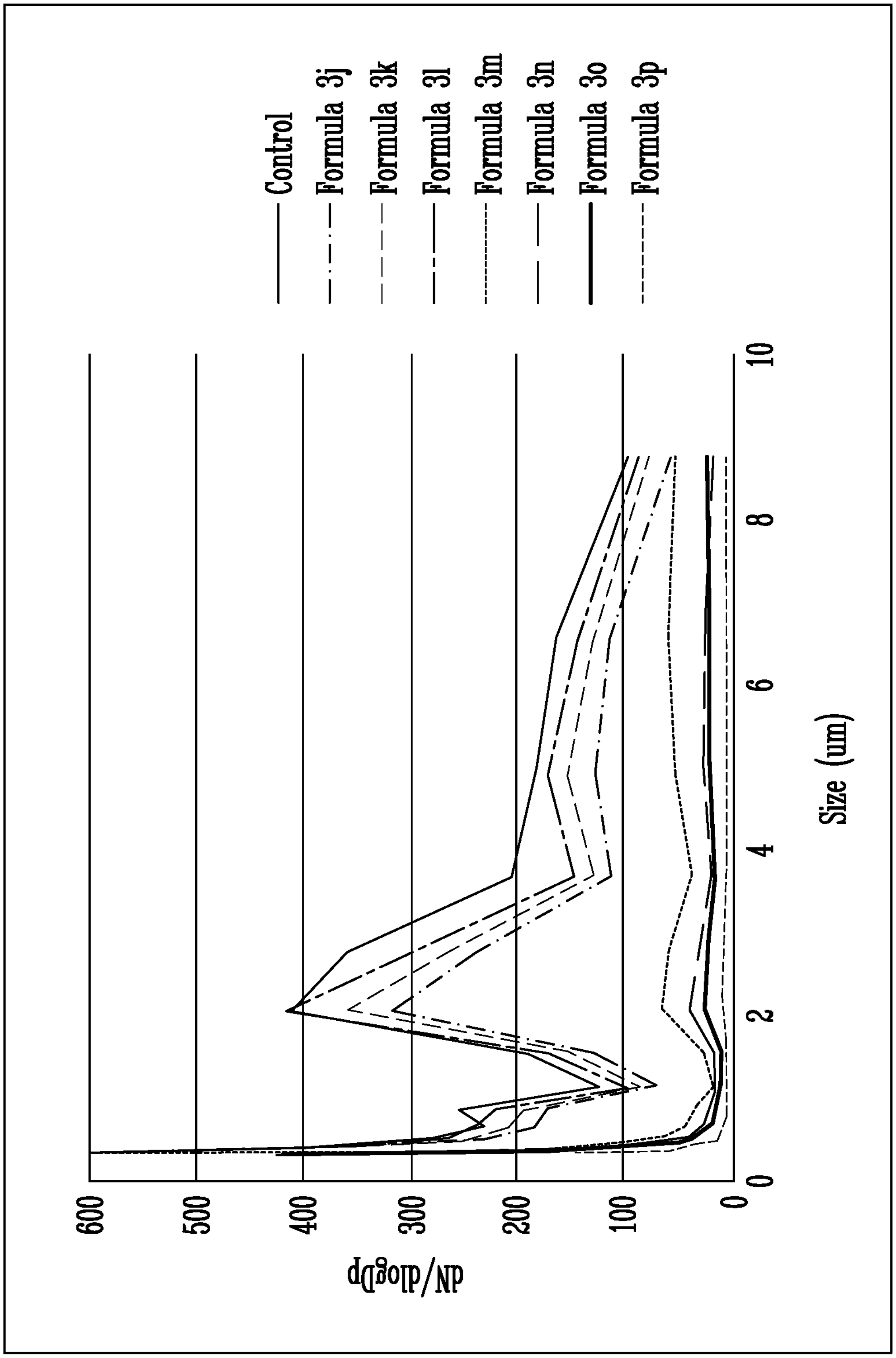
FIG. 6 shows concentration of misting in control and various formulations (Formula 3j, Formula 3k, Formula 31, Formula 3m, Formula 3n, Formula 3o, Formula 3p) evaluated according to embodiments of the invention as set forth in Example 4.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to reduced misting chlorine-based hard surface cleaning compositions. The reduced misting chlorine-based cleaning compositions have many advantages over conventional chlorine-based cleaning compositions. For example, the compositions reduce particulate matter and therefore inhalation by a user. In an aspect, the chlorine-based solutions produces a total concentration of misting of particles having a size of 10 microns or less within a breathing zone of a user of less than or equal to 60 particles/$cm^3$. In still further aspects, the chlorine-based solutions are delivered in micron sized particles that reduce inhalation, such as for example by delivering compositions at a particle size of at least about 10 microns to minimize the inhalation of particles.

The embodiments of this invention are not limited to particular compositions and/or methods of employing the same for hard surface cleaning, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the terms "active chlorine", "chlorine", and "hypochlorite" are all used interchangeably and are intended to mean measureable chlorine available in a use solution as evaluated by standard titration techniques known to those of skill in the art.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, auto dish sanitizers, sanitizing gels, cooling towers, food processing antimicrobial garment sprays, and non-to-low-aqueous food preparation lubricants, oils, and rinse additives.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Chlorine-Based Cleaning Compositions

The present invention relates to sprayable aqueous chlorine based cleaning compositions comprising, consisting of or consisting essentially of at least alkali metal hypochlorite, sodium hydroxide (or alternative alkali metal alkalinity sources), and a surfactant system. In some aspects, the surfactant system comprises, consists of or consists essentially of three surfactants. In one embodiment, the sprayable chlorine based composition may be dispensed with a trigger sprayer, such as non-low velocity or a low velocity trigger sprayer. The atmospheric chlorine of the atmosphere surrounding the dispersal site immediately after spray application of the current aqueous chlorine based cleaning composition is less than that of an aqueous chlorine based cleaning solution not including the surfactant system. The current sprayable chlorine based composition may also exhibit improved cling, which results in longer surface exposure and perhaps increased cleaning efficiency. The current cleaning composition may also provide increased surface coverage and increased droplet size or reduced atomization of the particles compared to cleaning compositions not including the surfactant system.

The RTU sprayable composition may be referred to as a non-Newtonian fluid. Newtonian fluids have a short relaxation time and have a direct correlation between shear and elongational viscosity (the elongational viscosity of the fluid equals three times the shear viscosity). Shear viscosity is a measure of a fluid's ability to resist the movement of layers relative to each other. Elongational viscosity, which is also known as extensional viscosity, is measure of a fluid's ability to stretch elastically under elongational stress. Non-Newtonian fluids do not have a direct correlation between shear and elongational viscosity and are able to store elastic energy when under strain, giving exponentially more elongational than shear viscosity and producing an effect of thickening under strain (i.e., shear thickening). These properties of non-Newtonian fluids result in the sprayable composition that has a low viscosity when not under shear but that thickens when under stress from the trigger sprayer forming larger droplets.

In an aspect of the invention, a suitable median particle size is about 11 microns or greater. A particularly suitable median particle size is about 50 microns or greater. A more particularly suitable median particle size is about 70 microns or greater, about 100 microns or greater, about 150 microns or greater, or about 200 microns or greater. The suitable median particle size may depend on the composition of the RTU. For example, a suitable median particle size for a strongly alkaline use solution may be about 100 microns or greater, and more particularly about 150 microns or greater, and more particularly about 200 microns or greater. A suitable median particle size for a moderately alkaline RTU may be about 11 microns or greater, preferably about 50 microns or greater, and more preferably about 150 microns or greater.

In another example, a flowable RTU sprayable composition contains a sufficient amount of anti-mist component, as referred to herein as the chlorine-stable surfactant system, such that the median particle size of the dispensed use solution is sufficiently large enough to reduce misting. As one skilled in the art appreciates, particles having droplet size of less than about 10 microns can be readily inhaled. Moreover, particles having droplet size of less than about 0.1 microns can be readily inhaled into the lungs. Therefore, in many aspects of the invention the testing and evaluation of the sprayable compositions according to the invention focus on the reduction of misting, in particular micron sizes of about 10 or less.

Chlorine Source

In an aspect, the sprayable cleaning composition includes a chlorine source. A source of chlorine according to the invention includes any source of active chlorine or hypochlorite ion. Some examples of classes of compounds that can act as sources of chlorine include any source that in a use solution results in available chlorine, such as hypochlorite, a chlorinated phosphate, a chlorinated isocyanurate, a chlorinated melamine, a chlorinated amide, and the like, or mixtures of combinations thereof.

Some specific examples of sources of chlorine can include sodium hypochlorite, potassium hypochlorite, calcium hypochlorite, lithium hypochlorite, chlorinated trisodiumphosphate, sodium dichloroisocyanurate, potassium dichloroisocyanurate, pentaisocyanurate, trichloromelamine, sulfondichloro-amide, 1,3-dichloro 5,5-dimethyl hydantoin, N-chlorosuccinimide, N,N'-dichloroazodicarbonimide, N,N-chloroacetylurea, N,N'-dichlorobiuret, trichlorocyanuric acid and hydrates thereof, or combinations or mixtures thereof.

In an aspect of the invention, the chlorine source is an alkali metal hypochlorite, hypochlorite-producing compound and/or a bleach source. In a preferred aspect, the chlorine source is an alkali metal hypochlorite. Suitable alkali meal hypochlorites include sodium, potassium, lithium and calcium hypochlorite and mixtures thereof. Particularly preferred is sodium hypochlorite.

In an aspect, the compositions include from about 0.1 wt-%-35 wt-% chlorine source, from about 0.2 wt-%-25 wt-% chlorine source, from about 0.5 wt-%-25 wt-% chlorine source. A preferred chlorine source is an alkali metal hypochlorite, preferably sodium hypochlorite. As one skilled in the art will recognize, the weight percent ranges are impacted by the variable percent actives of the raw material employed for the compositions. In an exemplary aspect, a 10% active chlorine source, such as sodium hypochlorite is employed. Without being limited according to the invention, all ranges recited are inclusive of the numbers defining the range and include each integer within the defined range.

Alkalinity Source

In an aspect, the sprayable cleaning composition includes an alkalinity source. The source of alkalinity can be an organic source or an inorganic source of alkalinity. For the purposes of this invention, a source of alkalinity also known as a basic material is a composition that can be added to an aqueous system and result in a pH greater than about 7. In preferred aspects of the invention, an alkaline pH of at least about 10 is employed to maintain chlorine stability within the sprayable cleaning composition. Accordingly, the alkalinity source is added to an aqueous system according to the invention to provide an alkaline pH of at least about 10, at least about 11, at least about 11.5, at least about 12, preferably from about 11 to about 13, more preferably from about 11.5 to about 13, or still more preferably from about 12 to about 13.

As one skilled in the art would refer to the sprayable cleaning compositions according to the invention, a strongly alkaline RTU may have a pH of about 11 or greater, and a moderately alkaline RTU may have a pH between about 7 and about 11. According to an aspect of the invention, the alkalinity source is provided in an amount sufficient to generate a strongly alkaline RTU.

Alkaline cleaner compositions are well known as those that contain alkali or alkaline earth metal borates, silicates, carbonates, hydroxides, phosphates and mixtures thereof. It is to be appreciated that phosphate includes all the broad class of phosphate materials, such as phosphates, pyrophosphates, polyphosphates (such as tripolyphosphate) and the like. Silicates include all of the usual silicates used in cleaning such as metasilicates, silicates and the like. The alkali or alkaline earth metals include such components as sodium, potassium, calcium, magnesium, barium and the like. It is to be appreciated that a cleaner composition can be improved by utilizing various mixtures of alkalinity sources.

In a preferred aspect, the alkalinity source is an inorganic alkali metal base. In a further preferred aspect, the alkalinity source is an alkali metal hydroxide. The sprayable cleaning composition may include, for example, sodium hydroxide, which may stabilize the chlorine source and improve shelf life.

In one example, an effective amount of the alkalinity source is added to maintain an alkaline pH. Suitable concentrations of the alkalinity source, such as sodium hydroxide, include between about 0.1% and about 5% by weight, and more preferably between about 0.1% and about 1% by weight of the cleaning composition. Without being limited according to the invention, all ranges recited are inclusive of the numbers defining the range and include each integer within the defined range.

Surfactants

In an aspect, the sprayable cleaning composition further includes a chlorine-stable surfactant system. In a preferred aspect, the surfactant system comprises at least two surfactants. In a further preferred aspect, the surfactant system comprises at least three surfactants. Without being limited to a particular theory of the invention, it is believed that the surfactants produce rod micelles and the intertwining of the rod micelles results in a viscoelastic property in the cleaning composition. Beneficially, the combination of surfactants in the surfactant system according to the invention forms viscoelastic solutions having a thickened viscosity due to the formation of rod micelles.

In an aspect, a low concentration of the surfactant system may be used. For example, the surfactant system may be present in active amounts between about 1.5% and about 7.5% actives. In one example, the sprayable cleaning composition includes surfactant systems between about 1.5% and about 5% actives, or about 1.75% actives to about 5% actives. In a still further aspect, the sprayable cleaning composition includes surfactant systems from about 1.75% actives to about 2% actives. In addition, without being limited according to the invention, all ranges recited are inclusive of the numbers defining the range and include each integer within the defined range.

In an aspect, the surfactant system comprises, consists of or consists essentially of a first, second and/or third surfactant. In preferred aspects the surfactant systems include bleach-stable nonionic surfactants, preferably amine oxides. In preferred aspects the surfactant systems further include bleach-stable anionic surfactants, preferably sulfonates. In additional optional aspects the surfactant systems further include bleach-stable anionic surfactants, preferably carboxylates.

First Surfactant—Amine Oxide Surfactants

In preferred aspects the surfactant systems include a bleach-stable nonionic surfactant, preferably amine oxides. Amine oxides are tertiary amine oxides corresponding to the general formula:

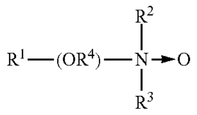

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Amine oxides, such as tertiary amine oxides, may also be used as surfactants for the sprayable aqueous cleaning compositions according to the invention. Tertiary amine oxide surfactants typically comprise three alkyl groups attached to an amine oxide (N→O). Commonly the alkyl groups comprise two lower (C 1-4) alkyl groups combined with one higher (C 6-24) alkyl groups, or can comprise two higher alkyl groups combined with one lower alkyl group. Further, the lower alkyl groups can comprise alkyl groups substituted with hydrophilic moiety such as hydroxyl, amine groups, carboxylic groups, etc. Suitable amine oxide materials include dimethylcetylamine oxide, dimethyllaurylamine oxide, dimethylmyristylamine oxide, dimethylstearylamine oxide, dimethylcocoamine oxide, dimethyldecylamine oxide, and mixtures thereof. The classification of amine oxide materials may depend on the pH of the solution. On the acid side, amine oxide materials protonate and can simulate cationic surfactant characteristics. At neutral pH, amine oxide materials are non-ionic surfactants and on the alkaline side, they exhibit anionic characteristics.

Additional disclosure of suitable tertiary alkyl amine oxide surfactants is set forth in U.S. Pat. No. 5,462,689, which is incorporated herein by reference in its entirety. In a preferred aspect, the first surfactant is hexadecyldimethylamine oxide (a $C_{16}$ amine oxide). Suitable commercial sources of hexadecyldimethylamine oxide include Barlox 16s available from Lonza, Allendale, N.J. Suitable concentrations of the first surfactant include between about 0.05% and about 2.0% by weight, and more preferable between about 0.5% and about 1.5% by weight of the cleaning composition.

Second Surfactant—Sulfonate Surfactants

In preferred aspects the surfactant systems further include a bleach-stable anionic surfactant, preferably sulfonate surfactants. Anionic sulfonate surfactants are suitable for use in the present compositions, and may include for example alkyl sulfonates, the linear and branched primary and secondary alkyl sulfonates, and the aromatic sulfonates with or without substituents.

In an aspect, the second surfactant comprises, consists of or consists essentially of at least one $C_8$-$C_{20}$ sulfonate. More preferably, the second surfactant comprises, consists of or consists essentially of at least one at least one $C_{12}$-$C_{18}$ sulfonate, and most preferably, at least one $C_{14}$-$C_{17}$ sulfonate. Unexpectedly, according to the invention, the inclusion of a mid-to-long chain length sulfonate with the nonionic amine oxide surfactant of the surfactant system beneficially results in thickening (including rod micelle formation) of the sprayable aqueous solutions.

Third Surfactant—Carboxylate Surfactants

In preferred aspects the surfactant systems further include a second bleach-stable anionic surfactant, preferably carboxylates. Anionic carboxylate surfactants suitable for use in the present compositions include for example carboxylic acids (and salts), such as alkanoic acids (and alkanoates), ester carboxylic acids, ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain at least 8 total carbon atoms, although more carbons atoms (e.g., up to 22) can be present.

In an aspect, the third surfactant comprises, consists of or consists essentially of at least one $C_8$-$C_{22}$ carboxylate, preferably a $C_{12}$-$C_{22}$ carboxylate, more preferably a $C_{14}$-$C_{18}$ carboxylate. More preferably, the third surfactant comprises, consists of or consists essentially of at least one $C_8$-$C_{22}$ carboxylate or more preferably a $C_8$-$C_{10}$ carboxylate. Unexpectedly, according to the invention, the inclusion of a mid-to-long chain length carboxylates with the nonionic amine oxide surfactant of the surfactant system beneficially results in thickening (including rod micelle formation) of the sprayable aqueous solutions.

In one exemplary surfactant system, the second and/or third surfactants are mixed together prior to the addition of other components of the cleaning composition. For example, a $C_{14}$-$C_{17}$ sodium alkane sulfonate and a $C_9$ sodium fatty carboxylate can be mixed prior to the addition to the cleaning composition. Suitable commercially available mixtures of second and third surfactants include Surtech SC-45 available from Surface Chemists of Florida, Inc., Jupiter, Fla.

In other aspects according to the invention, the sprayable aqueous cleaning composition does not require the use of the carboxylate surfactant. For example, in such embodiments, the surfactant system may comprise, consist of and/or consist essentially of an amine oxide surfactant and a sulfonate surfactant.

In an aspect, a suitable actives ratio of the first surfactant to the second and/or third surfactants (combined actives second and third surfactants) is at least about 2:1. In another aspect, a suitable actives ratio of the first surfactant to the second and/or third surfactants is at least about 3:1. In another aspect, a suitable actives ratio of the first surfactant to the second and/or third surfactants is from about 2:1 to about 4:1.

In preferred aspects, the second surfactant and/or third surfactant are present in a total actives amount of at least about 1.5%, between about 1.5% and about 2 wt % actives, or between about 1.5% and about 1.75% actives and having a actives ratio of the first surfactant to the second and/or third surfactants (combined actives of second and third surfactants) of about 2:1, while producing a total concentration of misting (particles having a micron size of 10 or less) within a breathing zone of a user of less than or equal to 60 particles/$cm^3$.

In still further preferred aspects, the second surfactant and/or third surfactant are present in a total actives amount of at least about 1.5%, between about 1.5% and about 2% actives, or between about 1.5% and about 1.75% actives and having a actives ratio of the first surfactant to the second and/or third surfactants (combined actives second and third surfactants) of about 2:1 to about 3:1, or preferably about 3:1, while producing a total concentration of misting (particles having a micron size of 10 or less) within a breathing zone of a user of less than or equal to 60 particles/$cm^3$.

In still further preferred aspects, the second surfactant and/or third surfactant are present in a total actives amount of at least about 1%, between about 1% and about 2% actives, or between about 1.5% and about 1.75% actives and having a actives ratio of the first surfactant to the second and/or third surfactants (combined actives second and third surfactants) of about 2:1 to about 4:1, or preferably about 4:1, while producing a total concentration of misting (particles having a micron size of 10 or less) within a breathing zone of a user of less than or equal to 60 particles/$cm^3$.

In an aspect, the sprayable aqueous cleaning composition beneficially provides a reduction of airborne particles having a micron size of 10 or less within a breathing zone of a user. As referred to herein, a breathing zone refers to the space surrounding a user's face (e.g. nose and mouth) wherein airborne particles from a sprayable composition would be subject to inhalation by the user. A reduction of particles within the breathing zone beneficially reduces the amount of inhalation of such particles. In a preferred aspect, the sprayable aqueous cleaning compositions produce a reduction of particles having a size of about 10 microns or less, which can be readily inhaled within such breathing zone of a user. In a preferred aspect, the sprayable aqueous cleaning compositions have particle size of greater than 10 microns, greater than 50 microns, greater than 70 microns, or greater than 100 microns.

In a preferred aspect, the sprayable aqueous cleaning compositions reduce particulates having a micron size of 10 or less to less than or equal to 70 particles/$cm^3$, preferably less than or equal to 60 particles/$cm^3$, and still more preferably less than or equal to 50 particles/$cm^3$.

Additional Chlorine-Stable Surfactants

In additional embodiments, the compositions of the present invention include an additional surfactant, which may include, but are not limited to, nonionic surfactants, cationic surfactants, anionic surfactants, amphoteric surfactants and zwitterionic surfactants that are chlorine-stable. Examples of suitable chlorine-stable surfactants include amine oxides, carboxylates, and sulfonates.

Nonionic Surfactants

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

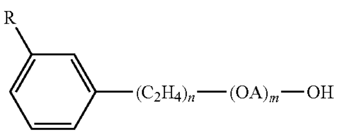

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_XH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}—(PO)_SN-(EO)_tH$, $R^{20}—(PO)_SN-(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)_V—N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

Additional useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

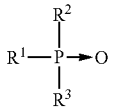

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

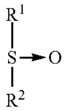

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

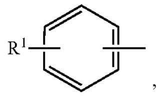

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

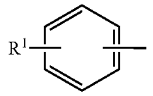

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

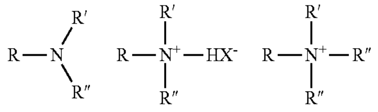

in which, R represents a long alkyl chain, R', R", and R'" may be either long alkyl chains or smaller alkyl or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989).

The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

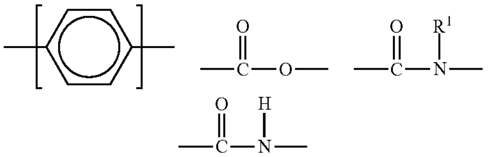

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

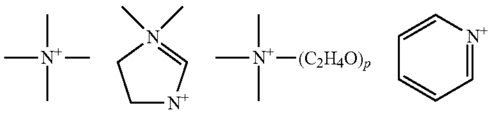

$p$ = about 1 to 12

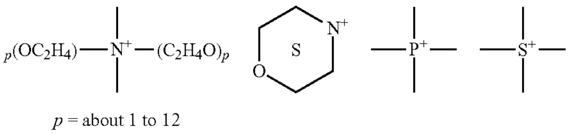

$p$ = about 1 to 12

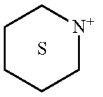

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

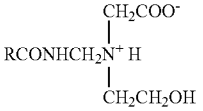

(Mono)Acetate

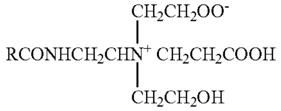

(Di)Propionate

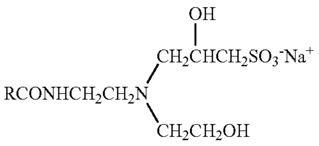

Neutral pH-Zwitterion
Amphoteric Sulfonate wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+(CH_2—CH_2—CO_2Na)_2$—$CH_2$—$CH_2$—OH or $C_{12}$-alkyl-C(O)—N(H)—$CH_2$—$CH_2$—$N^+(CH_2—CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

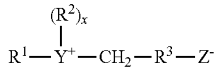

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

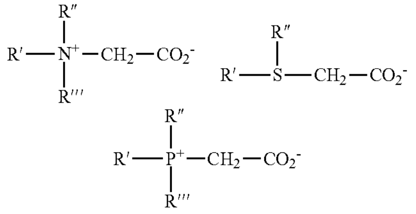

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Hewing on Dec. 30, 1975. Further examples are given in "Surface Active Agents and Detergents" (Vol. I and II by Schwartz, Perry and Berch). Each of these references are herein incorporated in their entirety.

Water

In an aspect, the sprayable cleaning composition further includes water. Suitable concentrations of water include between about 25% and about 99% by weight of the cleaning composition. More preferable concentrations of water include between about 50% and about 98% by weight of the cleaning composition and most preferable between about 60% and about 97% by weight of the cleaning composition. It is understood that water may be added to the cleaning composition as a discrete component or may be added as water of hydration.

Additional Functional Ingredients

The components of the aqueous, ready-to-use chlorine-based cleaning compositions can further be combined with various functional components. In some embodiments, the compositions including the chlorine source, alkalinity source (including for example caustic and other alkaline compositions suitable for maintaining shelf-life of the compositions at an alkaline pH for maintained chlorine-stability), surfactants and water make up a large amount, or even substantially all of the total weight of the composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in the aqueous use solution provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in hard surface cleaning. However, other embodiments may include functional ingredients for use in other applications.

In some aspects, the chlorine content of the current cleaning composition prevents the usage of xantham gum and other polymers as thickening agents. Accordingly, in some aspects the compositions do not include the use of thickening agents and/or are substantially free of thickening agents. Instead, it was surprising found that a combination of surfactants alone formed a viscoelastic solution due to the formation of rod micelles.

Beneficially, the cleaning compositions have a viscosity that is adequate to maintain contact with the soil (e.g. soil on a treated hard surface) for at least a minute, preferably five minutes or more and also reduce misting. In preferred embodiments, the compositions do not include thickening agents. In preferred embodiments, the compositions do not include additional surfactants.

In other embodiments, the compositions may include solvents, solubility modifiers, metal protecting agents, stabilizing agents, corrosion inhibitors, sequestrants and/or chelating agents, fragrances and/or dyes, rheology modifiers or thickeners, hydrotropes or couplers, buffers, adjuvant materials for hard surface cleaning and the like. Exemplary adjuvant materials for hard surface cleaning may include foam enhancing agents, foam suppressing agents (when desired), preservatives, antioxidants, pH adjusting agents, perfumes, colorants, or pacifying or pearlescent agents, builder salts, cosolvents and other useful well understood material adjuvants.

Thickeners or Viscosity Modifiers

The compositions provide anti-misting of the cleaning compositions without the use of traditional viscosity modifiers, but in some embodiments, a traditional thickener or viscosity modifier may be added in combination with surfactant system providing anti-mist and viscosity modification disclosed herein.

A variety of well-known organic thickener materials are known in the art. Preferred thickeners are natural polymers or gums derived from plant or animal sources. Such materials are often large polysaccharide molecules having substantial thickening capacity.

A substantially soluble organic thickener can be used to provide thixotropy to the compositions of the invention. The preferred thickeners have some substantial proportion of water solubility to promote easy removability. Examples of soluble organic thickeners for the aqueous compositions of the invention comprise carboxylated vinyl polymers such as polyacrylic acids and sodium salts thereof, boric acid, diethanolamide, coco-diethanolamide, coco-monoethanolamide, stearic-diethanolamide, ethoxylated cellulose, hydroxyethyl styrylamide, oleic-diethanolamide, stearic-monoethanolamide, cetyl alcohol, steroyl alcohol, polyacrylamide thickeners, ethanol glycol disterate, xanthan compositions, sodium alginate and algin products, hydroxypropyl cellulose, hydroxyethyl cellulose, and other similar aqueous thickeners that have some substantial proportion of water solubility. Preferred thickeners for use in the alkaline composition of the invention are xanthan thickeners sold by the Kelco Division of Merck under the tradenames KELTROL, KELZAN AR, KELZAN D35, KELZAN S, KELZAN XZ, and others. Such xanthan polymers are preferred due to their high water solubility, and great thickening power. Most preferably fully hydrolyzed (greater than 98.5 mol % acetate replaced with the —OH function).

Preferred thickeners for inorganic alkaline cleaners include xanthan gum derivatives. Xanthan is an extracellular polysaccharide of xanthomonas campestras. Xanthan is made by fermentation based on corn sugar or other corn sweetener by-products. Xanthan comprises a poly beta-(1→4)-D-Glucopyranosyl backbone chain, similar to that found in cellulose. Aqueous dispersions of xanthan gum and its derivatives exhibit novel and remarkable rheological properties. Low concentrations of the gum have relatively high viscosity which permits it economical use and application. Xanthan gum solutions exhibit high pseudoplasticity, i.e. over a wide range of concentrations, rapid shear thinning occurs that is generally understood to be instantaneously reversible. Non-sheared materials have viscosity that appears to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which patent is incorporated by reference herein. Suitable crosslinking agents for xanthan materials include metal cations such as $Al^{+3}$, $Fe^{+3}$, $Sb^{+3}$, $Zr^{+4}$ and other transition metals, etc. Known organic crosslinking agents can also be used. The preferred crosslinked xanthan agent of the invention is KELZAN AR, a product of Kelco, a division of Merck Incorporated. KELZAN AR is a crosslinked xanthan that provides a thixotropic cleaner that can produce large particle size mist or aerosol when sprayed. When present, the thickener is typically in the composition in an amount of from about 0.005 wt-% to about 1.0 wt-%, or about 0.01 wt-% to about 0.5 wt-%.

Aqueous Solvents

The cleaning compositions can optionally contain a compatible solvent. Suitable solvents are soluble in the aqueous cleaning composition of the invention at use proportions. The cleaner materials of the invention also typically include a volatile organic compound (VOC) such as but not limited to solvents. A compound is non-volatile if its vapor pressure is below 0.1 mm Hg at 20° C. VOCs have been the subject of regulation by different government entities, the most prominent regulations having been established by the California Air Resource Board in its General Consumer Products Regulation. Thus, it may be desirable to formulate the cleaner of the invention containing low or no VOCs.

Preferred soluble solvents include lower alkanols, lower alkyl ethers, and lower alkyl glycol ethers. These materials are colorless liquids with mild pleasant odors, are excellent solvents and coupling agents and are typically miscible with aqueous cleaning compositions of the invention. Examples of such useful solvents include methanol, ethanol, propanol, isopropanol and butanol, isobutanol, benzyl alcohol, ethylene glycol, diethylene glycol, triethylene glycol, propylene glycol, dipropylene glycol, mixed ethylene-propylene glycol ethers. The glycol ethers include lower alkyl ($C_{1-8}$ alkyl) ethers including propylene glycolmethyl ether, propylene glycol ethyl ether, propylene glycol phenyl ether, propylene glycol propyl ether, dipropylene glycol methyl ether, dipropylene glycol phenyl ether, dipropylene glycol ethyl ether, tripropylene glycol methyl ether, ethylene glycol methyl ether, ethylene glycol ethyl ether, ethylene glycol butyl ether, diethylene glycol methyl ether diethylene glycol phenyl ether, diethylene glycol butyl ether, ethylene glycol dimethyl ether, ethylene glycol monobutyl ether, ethylene glycol phenyl ether and others. The solvent capacity of the cleaners can be augmented by using monoalkanol amines. The solvent, when present is typically present in an amount of from about 0 wt-% to about 20 wt-%. In a preferred embodiment the solvent in not present in a ready to use solution in an amount of no more than 10 wt-%.

Sequestrants

The cleaning composition can contain an organic or inorganic sequestrant or mixtures of sequestrants. Organic sequestrants such as sodium citrate, the alkali metal salts of nitrilotriacetic acid (NTA), dicarboxymethyl glutamic acid tetrasodium salt (GLDA), EDTA, alkali metal gluconates, polyelectrolytes such as a polyacrylic acid, and the like can be used herein. The most preferred sequestrants are organic sequestrants such as sodium gluconate due to the compatibility of the sequestrant with the formulation base.

The present invention can also incorporate sequestrants to include materials such as, complex phosphate sequestrants, including sodium tripolyphosphate, sodium hexametaphosphate, and the like, as well as mixtures thereof. Phosphates, the sodium condensed phosphate hardness sequestering agent component functions as a water softener, a cleaner, and a detergent builder. Alkali metal (M) linear and cyclic condensed phosphates commonly have a $M_2O$:$P_2O_5$ mole ratio of about 1:1 to 2:1 and greater. Typical polyphosphates of this kind are the preferred sodium tripolyphosphate, sodium hexametaphosphate, sodium metaphosphate as well as corresponding potassium salts of these phosphates and mixtures thereof. The particle size of the phosphate is not critical, and any finely divided or granular commercially available product can be employed.

Metal Protectors

The compositions of the invention can contain a material that can protect metal from corrosion. Such metal protectors include for example sodium gluconate and sodium glucoheptonate. If present, the metal protector is present in the composition in an amount of from about 0.1 wt-% to about 10 wt-%.

Dyes/Odorants

Various dyes, odorants including perfumes, and other aesthetic enhancing agents may also be included in the compositions. Examples of suitable commercially available dyes include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keystone Aniline and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Examples of suitable fragrances or perfumes include, but are not limited to: terpenoids such as citronellol, aldehydes such as amyl cinnamaldehyde, a jasmine such as CIS jasmine or jasmal, and vanillin.

Surface Chemistry Modifiers

Various surface chemistry modifiers can be incorporated into the sprayable composition. Examples of suitable commercially available surface chemistry modifiers include Laponite® silicates available from Southern Clay Products, Inc. The surface chemistry modifiers may have high surface free energy and high surface area which leads to interactions with many types of organic compounds. In one example, suitable surface chemistry modifiers have a surface free energy of about 200 joules/meter$^2$ and a surface area of between about 750 and 800 m$^2$/gram. A suitable concentration range for surface chemistry modifiers in the ready-to-use solution is between about 10 ppm and about 100 ppm.

EMBODIMENTS

Exemplary ranges of the ready-to-use cleaning compositions according to the invention are shown in Table 1 in weight percentage. The total actives of the chlorine source and surfactants in the exemplary compositions are also shown in Table 1.

TABLE 1

| Material | First Exemplary Range wt-% | Second Exemplary Range wt-% | Third Exemplary Range wt-% | Fourth Exemplary Range wt-% |
|---|---|---|---|---|
| Chlorine Source | 0.01-35 | 0.1-30 | 0.2-25 | 0.5-25 |
| Chlorine Source (actives) | 0.01-25 | 0.1-15 | 0.2-10 | 0.5-5 |
| Alkalinity Source | 0.01-25 | 0.1-5 | 0.1-2 | 0.1-1 |
| Surfactants | 0.1-30 | 1-30 | 2-25 | 10-25 |
| Surfactants (actives) | 0.1-10 | 1-10 | 1.5-5 | 1.5-2 |
| Water | 25-99 | 50-98 | 60-97 | 70-96 |
| Additional Functional Ingredients | 0-50 | 0-25 | 0-20 | 0-10 |

Methods of Use

The sprayable chlorine based cleaning composition can be used in any environment where it is desirable to reduce the amount of airborne particulates of the composition during spray applications. Without being limited according to the mechanism of the invention, in one embodiment, when the sprayable ready-to-use solution is dispensed, the solution exhibits an increased median droplet size and reduced mist or aerosol. In one embodiment, the sprayable use solution produces little or no small particle aerosol. For example, the sprayable composition can be used in institutional applications, food and beverage applications, heath care applications, vehicle care applications, pest elimination applications, and laundering applications Such applications include but are not limited to kitchen and bathroom cleaning and destaining, general purpose cleaning and destaining, surface cleaning and destaining (particularly hard surfaces), industrial or household cleaners, and antimicrobial cleaning applications. Additional applications may include, for example, laundry and textile cleaning and destaining, carpet cleaning and destaining, vehicle cleaning and destaining, cleaning in place operations, glass window cleaning, air freshening or fragrancing, industrial or household cleaners, and antimicrobial cleaning. Methods of using the sprayable compositions are also provided.

The cleaners of the invention can be used in a pump spray format using a pump spray head and a suitable container. The materials are typically applied to hard surfaces containing difficult inorganic, organic, or matrix-blended soils. Such soils include baked-on or carbonized food residues. Other surfaces can contain soils derived from substantially insoluble hardness components of service water. The enhanced cleaning compositions of the invention rapidly remove such soils because the cleaners have a unique combination of cleaning ingredients combined with thickeners that can rapidly remove the soils but resist formation of an amount of mist or aerosol during application that can cause respiratory distress.

For the purpose of this application, the terms “aerosol” and “mist” refer to airborne dispersions of small particles comprising the cleaning composition that can remain suspended or dispersed in the atmosphere surrounding a cleaning site for at least 5 seconds, more commonly 15 seconds to 10 minutes.

The current cleaning composition can be a ready-to-use cleaning composition which may be applied with a transient trigger sprayer. A ready-to-use composition does not require dilution prior to application to a surface. The surfactant system may function to reduce atomization and misting of the current cleaning composition when dispensed using a sprayer. Example transient trigger sprayers include stock transient trigger sprayers (i.e., non-low velocity trigger sprayer) available from Calmar. Suitable commercially available stock transient trigger sprayers include Calmar Mixor HP 1.66 output trigger sprayer. The surfactant system may also increase the median particle size of the dispensed cleaning composition, which reduces inhalation of the use solution, and particularly reduces inhalation of chlorine.

The cleaning composition may also be dispensed using a low velocity trigger sprayer, such as those available from Calmar. A typical transient trigger sprayer includes a discharge valve at the nozzle end of the discharge end of a discharge passage. A resilient member, such as a spring, keeps the discharge valve seated in a closed position. When the fluid pressure in the discharge valve is greater than the force of the resilient member, the discharge valve opens and disperses the fluid. A typical discharge valve on a stock trigger sprayer is a throttling valve which allows the user to control the actuation rate of the trigger sprayer. The actuation rate of the discharge valve determines the flow velocity, and a greater velocity results in smaller droplets. A low velocity trigger sprayer can contain a two-stage pressure build-up discharge valve assembly which regulates the operator’s pumping stroke velocity and produces a well-defined particle size. In one example, the two-stage pressure build-up discharge valve can include a first valve having a high pressure threshold and a second valve having a lower pressure threshold so that the discharge valve snaps open and closed at the beginning and end of the pumping process. Example low-velocity trigger sprayers are commercially available from Calmar and are described in U.S. Pat. No. 5,522,547 to Dobbs and U.S. Pat. No. 7,775,405 to Sweeton, which are incorporated in their entirety herein. The low velocity trigger sprayers may result in less drifting, misting and atomization of the cleaning composition, and may reduce the amount of small droplets dispensed. The cleaning composition containing the surfactant system may work in synergy with the low velocity trigger sprayer to produce a greater increase in droplet size than expect based on the components alone.

The surfactant system is present in an effective amount and the composition can be readily applied to a target surface using a trigger sprayer. Too much surfactant system will lead to a cleaning composition so thick that it cannot be sprayed. To little surfactant system results in a watery solution that does not have the benefits discussed herein.

When sprayed, the thickened solution can result in reduced misting and atomization at least partially because the particles tend to clump together at the nozzle of the spray assembly. Reduced misting is particularly important with chlorine based cleaners in order to minimize the amount of atmospheric chlorine following the dispersion of the cleaner. In a preferred aspect, the sprayable aqueous cleaning compositions produce a reduction of particles having a size of about 10 microns or less. In a preferred aspect, the sprayable aqueous cleaning compositions have particle size of greater than 10 microns, greater than 50 microns, greater than 70 microns, or greater than 100 microns.

In further aspects of the invention, the sprayable aqueous cleaning compositions reduce particulates having a micron size of less than 10 to less than or equal to 70 particles/$cm^3$, preferably less than or equal to 60 particles/$cm^3$, and still more preferably less than or equal to 50 particles/$cm^3$.

Previous chlorine cleaners have been applied with a foaming applicator to reduce misting and atomization of the cleaning composition. While the foam application reduces misting and the amount of airborne chlorine, the applied foam covers minimal surface area compared to spray applications. Spray application of the current cleaning composition enables a greater surface area to be covered by the cleaning composition while still maintaining the same or a lower level of airborne chlorine.

The thickened solution may also result in larger droplets on the target surface. It is also beneficial for the cleaning composition to cling to a vertical surface for a period of time. Cleaning compositions applied to vertical surfaces typically run down the surface because of gravity. The thickened solution is able to cling to vertical surfaces for an increased period of time. That is, after an elapsed period of time, a greater amount of the current cleaning composition still remains on a vertical surface compared to compositions not including the surfactant system. This increased cling time leads to exposing the surface to the cleaning composition for a longer period of time and potentially better cleaning. The cleaning composition can be easily removed by wiping.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Various materials used in the following Examples are provided herein:

NAS-FAL: sodium 1-octanesulfonate.

Barlox 12: a cocoamine oxide surfactant available from Lonza Inc., Allendale, N.J.

Barlox 16s: a cetylamine oxide surfactant available from Lonza Inc., Allendale, N.J.

Surtech SC-45: A surfactant containing a mixture of sodium alkane sulfonate and sodium fatty carboxylate and available from Surface Chemists of Florida, Inc., Jupiter, Fla.

Dowfax 3B2: alkyldiphenyloxide disulfonate available from Dow Chemical.

SXS: sodium xylenesulphonate available for example from Stepan Company.

SAS: secondary alkane sulfonate available for example from Clarion.

Colatrope INC: sodium alkonate available from Colonial Chemical Inc.

Control: A commercially-available chlorinated hard surface cleaner containing 2% by weight sodium hypochlorite and 1-5% by weight sodium 1-octane sulfonate.

Example 1

Spray Pattern. The spray pattern test was designed to visually grade the suitability of the samples for spray applications. For each sample, 30% active Barlox 16s was solubilized to a 6% active solution. The mixture was stirred with an overhead rotor at speeds between 600 and 900 rotations per minute (rpm), and the following were added in thirty minute increments: Surtech SC-45, NaOH, and NaOCl. After adding NaOCl, the mixture was stirred for one hour and allowed to settle overnight. Each sample had a Barlox 16s:Surtech SC-45 active ratio of 2:1, while the total surfactant active amount was varied between 1% and 2%. Each sample was sprayed using a transient trigger sprayer available from Calmar (Calmar Mixor HP 1.66 output trigger sprayer). The composition of each sample along with an observation of the spray application is provided in Table 2.

TABLE 2

(by weight-%)

| | Barlox 16S (6%) | Surtech SC-45 (40%) | NaOH (50%) | NaOCl (10%) | Water | Comments |
|---|---|---|---|---|---|---|
| Sample 1 | 11.11% | 0.83% | 1% | 20% | 67.06% | When sprayed, solution was thick. No effect on droplet size distribution |
| Sample 2 | 16.66 | 1.25 | 1% | 20% | 61.09% | Some effect on mist-reduction but still significant amount of misting |
| Sample 3 | 19.43% | 1.46% | 1% | 20% | 58.11% | Good mist reduction with good spray range |
| Sample 4 | 22.22% | 1.66% | 1% | 20% | 55.12% | Spray was very stream-like and gave minimal amount of spray. |

Sample 3, which contained 1.75% active surfactant provided the most preferable solution when applied with a trigger sprayer. Sample 1, which contained 1% active surfactant, did not exhibit a reduction in misting when applied with a trigger sprayer, while Sample 4, which contained 2% active surfactant, had a viscoelasticity greater than preferred. Sample 3 was stored in a 120° F. oven for two weeks. No changes in properties were observed when Sample 3 was applied with a trigger sprayer following the storage period.

Example 2

Chlorine Titration. Chlorine stability of Sample 3 described in Example 1 was tested by titration. By titration, Sample 3 had 2.02% chlorine on the day the solution was made. After storage for two weeks at 120° F., Sample 3 had 1.60% chloride, indicating suitable chloride stability even when stored at an elevated temperature (based on 120° F. for two weeks as a benchmark for commercial stability at room temperature for at least six months).

Example 3

Cling Test. The purpose of the cling test is to compare the ability of a stock mixture and a thickened mixture to cling to a vertical surface. A mixture was sprayed on a plastic board with either a stock trigger sprayer or a low velocity trigger sprayer, which was primed and positioned four inches horizontally from a plastic board. The nozzle of the trigger sprayer was directed at a position about two-thirds from the bottom of the plastic board. For each mixture, the sprayer was sprayed three times and the mixture applied to the board was allowed to run for a given amount of time (run time) after which the board was weighted. The delta weight was calculated as the difference between the initial weight of the board and that of the board after the run time. A higher delta weight suggests more test mixture was present on the board.

Samples 5-8: A stock mixture and a thickened mixture were tested using a stock sprayer and a low velocity sprayer. The stock mixture was the Control (commercially-available chlorinated hard surface cleaner containing 2% by weight sodium hypochlorite and 1-5% by weight sodium 1-octane sulfonate). The thickened mixture was formed by adding Barlox 16s and Surtech SC-45 in an active ratio of 2:1 to Control to form a mixture containing 1.75 wt % active surfactant (Barlox 16s and Surtech SC-45).

The average weight per spray for the stock mixture/stock sprayer was 1.59 g/spray; stock mixture/low velocity sprayer was 1.45 g/spray; thickened mixture/stock sprayer was 1.45 g/spray; and thickened mixture/low velocity sprayer 1.39 g/spray.

The calculated delta weight for the stock mixture and the thickened mixture applied with a stock sprayer and a low velocity sprayer are provided in Table 3. An error in Sample 5 run occurred and therefor excluded from the testing results.

TABLE 3

| | Run | Run Time | Delta weight |
|---|---|---|---|
| Sample 5 | 1 | 5 | N/A |
| (Stock mixture/ | 2 | 5 | 0.95 |
| stock sprayer) | 3 | 5 | 1.15 |
| | 4 | 5 | 1.30 |
| | 5 | 10 | 0.74 |
| Sample 6 | 1 | 5 | 4.09 |
| (Thickened mixture/ | 2 | 5 | 4.02 |
| stock sprayer) | 3 | 10 | 3.20 |
| Sample 7 | 1 | 10 | 0.91 |
| (Stock mixture/ | 2 | 10 | 0.86 |
| low vel. Sprayer) | | | |
| Sample 8 | 1 | 10 | 2.40 |
| (Thickened mixture/ | 2 | 10 | 2.76 |
| low vel. Sprayer) | | | |

Significantly more thickened mixture remained on the plastic board compared to the stock mixture applied with the same sprayer after 5 and 10 minutes. Beneficially, the increased cling time increases the contact time of the cleaning composition on a vertical wall (or other surface to be cleaned) and may result in increased cleaning efficiency.

Example 4

TSI OPS particle size test. Various Control formula samples were evaluated with different surfactant ratios on the TSI OPS (optical particle sizer) particle size analyzer to determine mass and number counts of spray mist for each formula sample after being sprayed into a shower stall. A TSI OPS device with Aerosol Instrument Manager (AIM) Software (Release version 9.0.0.0, 15:32:53, Nov. 11, 2010) was employed for the following test methodology.

The OPS is connected to a power source and computer. The cap of OPS is removed to allow air to pass through the inlet at a rate of 1 L/min and is positioned within the "breathing zone" of the shower stall. As referred to herein, the breathing zone refers to the area wherein mist comes back towards a user who sprays a cleaning formulation for a particular cleaning application, after making contact with a surface in need of cleaning. To simulate the breathing zone, a bucket was placed on a cart and positioned to elevate the OPS to an appropriate height to mimic the height of administration of an average adult administering a cleaning composition into a shower stall. The testing for this Example established the "breathing zone" for the exemplary test as approximately 55 inches in height and 37.5 inches from the shower wall to the location of OPS device. Additional dimensions of the shower stall included 54 inches from the floor to spray nozzle, 55 inches from the floor to air inlet, 80 inches from the floor to the top of curtains, and 58 inches wide (shower stall). The shower stall walls are thoroughly wet down with water. An initial measurement is obtained and recorded for the air before testing any samples.

A Calmar Mixor sprayer was employed for each sample formulation, which was sprayed before each testing to ensure it was primed. The shower stall walls are again thoroughly wet down with water before application of the sample formulation. The OPS is powered to begin data collection while the sample formulation is sprayed into the shower stall. Each sample formulation is sprayed 40 times around the shower stall and the OPS collects the data for the sample formulation. During the testing drafts of air are avoided as they may disrupt sample collection by dispersing particles away from the test area. For each sample formulation 5 data collections are obtained and the highest particle count is used as the data point for the sample formulation.

After each tested sample formulation the shower stall is aired out, such as by using a fan or opening doors to the area to air out particles that were previously sprayed with the sample formulation. The remaining sample formulations are tested using the same procedure.

Various formulations were employed as outlined in Table 4 (contained in the FIGS. 10A-B). The Sample formulations tested employed the same concentration of bleach actives as the Control formulation, based on the commercial need for providing a bleaching/chlorine-stable aqueous use solution. The variables examined below in the formulations (shown in weight percentage) outlined in the Tables in FIGS. 10A-B vary the surfactants/co-surfactants employed and the concentrations thereof.

As shown in FIGS. 10A-B, the percentage active surfactant is the combination of all surfactants in the composition (e.g. Barlox 16S and Surtech SC-45 (or other surfactants tested). The ratios between the Barlox 16S and the co-surfactant actives are also shown in the Table of FIGS. 10A-B.

The results are shown in Table 4. Table 4 provides various measurements of concentration of mist generated within the breathing zone, including total concentration of mist, generated according to the Example with the various tested formulations. The formulations shown as highlighted beneficially provided a misting concentration of around 60 particles per $cm^3$.

TABLE 4

(mist generated)

| | Total Conc. (particles/$cm^3$) |
|---|---|
| Control | 404.7 |
| Sample 1 | 53.75 |
| Sample 2 | 100.7 |
| Sample 3 | 56.89 |
| Sample 4 | 103.9 |
| 1 | 136.8 |
| 2a | 93.26 |
| 2b | 83.43 |
| 2c | 62.46 |
| 2d | 251.7 |
| 2e | 44.2 |
| 2f | 309.9 |
| 2g | 50.33 |
| 2h | 281 |
| 3a | 195.6 |
| 3b | 241.4 |
| 3c | 299.1 |
| 3d | 151.7 |
| 3e | 141.7 |
| 3f | 134.7 |
| 3g | 28.37 |
| 3h | 170.7 |
| 3i | 148.7 |
| 3j | 297 |
| 3k | 339.8 |
| 3l | 377.2 |
| 3m | 104.5 |
| 3n | 57.9 |
| 3o | 47.44 |
| 3p | 15.86 |
| 3q | 24.9 |
| 3r | 55.09 |
| 3s | 25.12 |
| 3t | 15.92 |

The results are further shown graphically in FIGS. 1-6. The series of graphs are provided due to the large number of tested formulas showing the mass concentration of the formulations testing for mist reduction. Based on the prior Examples results Sample 3 was selected as the preferred composition for reduced misting. The data shown in Tables 4 and 6 confirm that Sample 3 generates a reduced concentration of misting, 56.891 particles per $cm^3$. Sample 3 established the preferred threshold for concentration of misting according to embodiments of the invention, preferably less than 60 particles per $cm^3$.

Formulation 1 replaced the Surtech SC-45 (40%) sulfonate and carboxylate surfactant with SXS (40%). This formulation was selected to provide a comparison to spray formulations disclosed in U.S. Pat. No. 5,462,689, which are disclosed as providing thickened viscoelastic cleaning compositions provided in aqueous solutions and having a 4:1 to 1:2 ratio of amine oxide to an organic counter ion (i.e. SXS). Sample 3 outperformed Formulation 1 providing substantially less misting and total concentration within the breathing zone, demonstrating the unexpected results of compositions the present invention, despite the maintained ratio of 2:1 Barlox 16S: Co-Surfactant Actives in Formulation 1.

Figure 7:
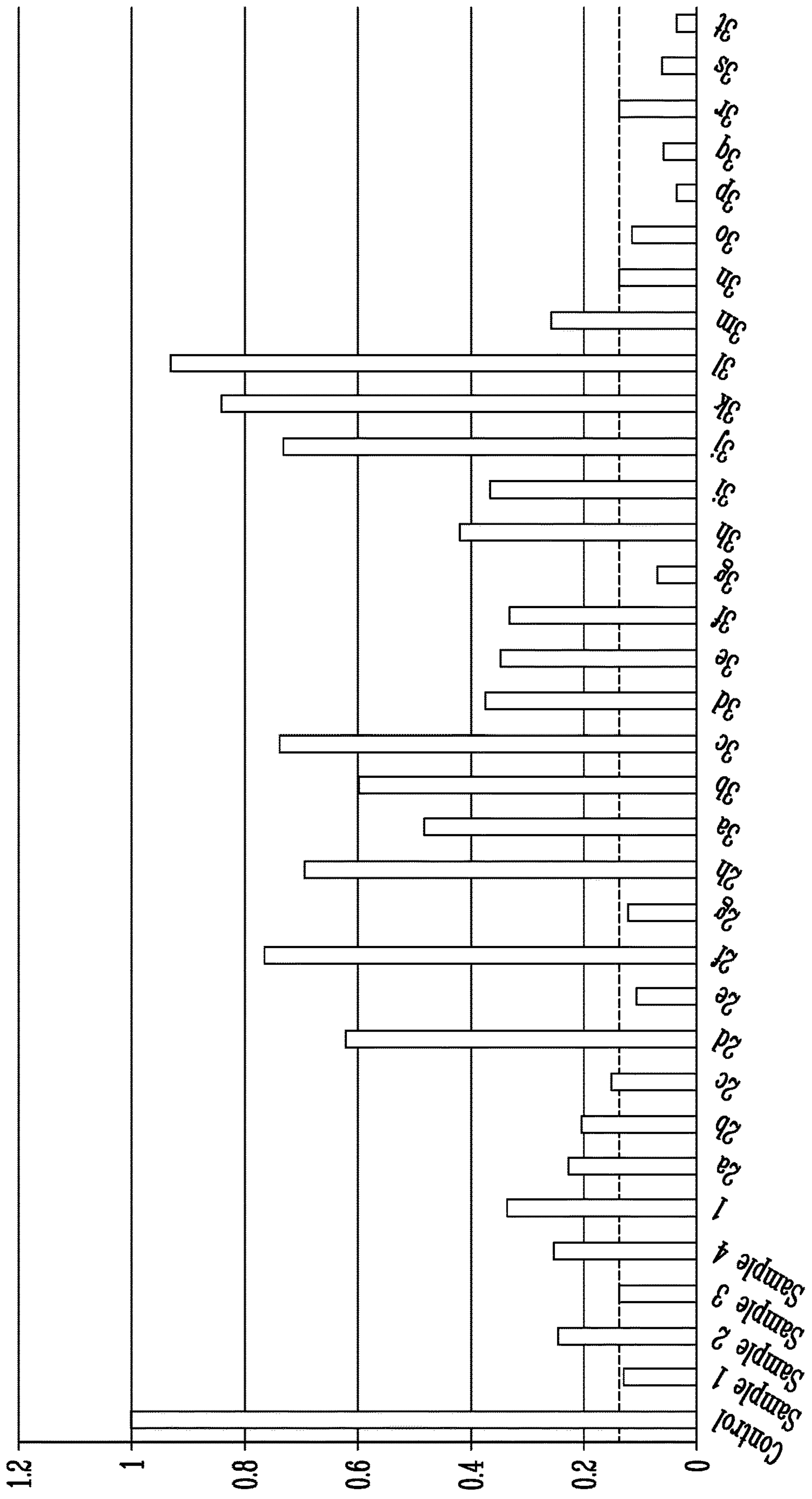
FIGS. 7-9 show misting concentrations evaluated according to the invention having been normalized to the control evaluated to demonstrate various embodiments of the invention providing anti-misting or low misting formulations.
Figure 9:
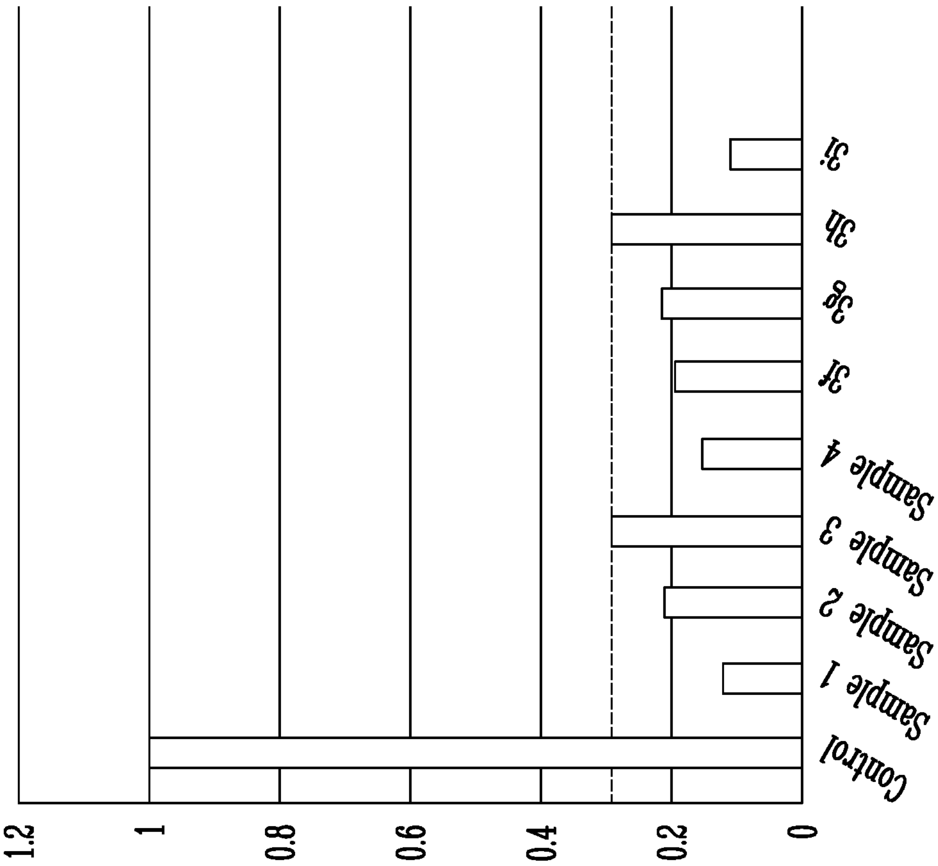
Figure 8:
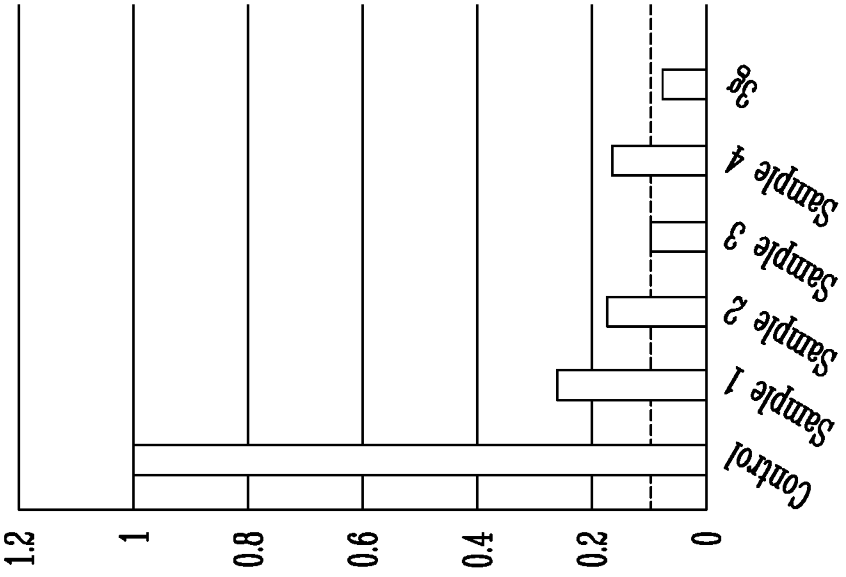

Further results are shown in Table 5 providing a measurement of concentration of mist generated within the breathing zone. The results were further normalized to the control, as shown in FIG. 7 for all evaluated formulations. FIGS. 8-9 show repeated analysis of various formulations normalized to control. As referred to herein, the normalized data used the Control as having a misting of 100% (as a point of comparison to the various formulations evaluated in the examples) with the y-axis showing the percentage of control misting for each evaluated formulation. The threshold for "anti-misting" or "low misting" is depicted in the figures having misting data points below the threshold (shown as dotted line).

TABLE 5

(mist generated)

| | Total Conc. (#/$cm^3$) | Normalized to Control |
|---|---|---|
| Control | 341.661 | 1 |
| Sample 1 | 41.7922 | 0.122321 |
| Sample 2 | 72.0785 | 0.210965 |
| Sample 3 | 99.34 | 0.290756 |
| Sample 4 | 55.111 | 0.152523 |
| 3e | 66.2453 | 0.193892 |
| 3f | 73.0153 | 0.213707 |
| 3g | 100.89 | 0.295293 |
| 3h | 38.2588 | 0.11979 |

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method for reducing inhalation of particulate matter while cleaning a hard surface with a chlorine composition, the method comprising:

forming an aqueous, ready-to-use, chlorine-based cleaning composition solution, comprising:

from about 50 wt-% and about 99 wt-% water;

at least one alkali metal hypochlorite present in an amount between about 0.1 wt-% and about 35 wt-%;

from about 0.1 wt-% and about 10 wt-% an alkali metal alkalinity source;

from about 10 wt-% to about 25 wt-% of a surfactant system comprising a first surfactant, a second surfactant and optionally a third surfactant, wherein the first surfactant is an alkyl amine oxide, the second surfactant is a $C_8$-$C_{20}$ alkane sulfonate, and the third surfactant is a $C_8$-$C_{12}$ carboxylate, wherein the actives ratio of the first surfactant to the second and optionally the third surfactant is at least about 2.1, and wherein the second surfactant and optionally the third surfactant are present in an amount of at least about 1.75% actives;

applying the aqueous, ready-to-use, chlorine-based cleaning composition solution to a hard surface for a sufficient amount of time with a trigger sprayer; and reducing misting and inhalation of particulate matter, wherein the aqueous solution produces a total concentration of misting of particulate matter having a micron size of 10 or less within a breathing zone of a user of less than or equal to 60 particles/$cm^3$.

2. The method of claim 1, wherein the actives ratio of the first surfactant to the second and optionally third surfactants is at least about 3:1 and wherein the second surfactant and optionally the third surfactant are present in a total amount of about 1.75% to about 2% actives.

3. The method of claim 1, wherein the actives ratio of the first surfactant to the second and optionally third surfactants is at least about 4:1 and wherein the second surfactant and optionally the third surfactant are present in a total amount of about 1.75% to about 2% actives.

4. The method of claim 1, wherein the first surfactant is hexadecyldimethylamineoxide, the second surfactant is a $C_{14}$-$C_{17}$ sulfonate, and the third surfactant is a $C_9$ sodium fatty carboxylate.

5. The method of claim 4, wherein the actives ratio of the hexadecyldimethylamineoxide surfactant to the $C_{14}$-$C_{17}$ sulfonate surfactant and optionally $C_9$ sodium fatty carboxylate surfactant is at least about 2:1, and wherein the $C_{14}$-$C_{17}$ sulfonate surfactant and optionally the $C_9$ sodium fatty carboxylate surfactant are present in a total amount of at least about 1.75% actives.

6. The method of claim 4, wherein the actives ratio of the hexadecyldimethylamineoxide surfactant to the $C_{14}$-$C_{17}$ sulfonate surfactant and optionally $C_9$ sodium fatty carboxylate surfactant is at least about 4:1.

7. The method of claim 1, wherein the alkali metal alkalinity source is an alkali metal hydroxide.

8. The method of claim 1, wherein the alkali metal hypochlorite is present in an amount between about 0.1 wt % and about 30 wt % and wherein the alkali metal alkalinity source is an alkali metal hydroxide present in an amount between about 0.1 wt % and about 5 wt %.

9. The method of claim 1, wherein the method reduces the number of droplets of particulate matter having a micron size of 0.1 or less which are readily inhaled by a user.

10. The method of claim 1, wherein the compositions provide droplets having a particle size greater than 10 microns.

11. The method of claim 1, wherein the compositions provide droplets having a particle size greater than 50 microns.

12. The method of claim 1, wherein the compositions provide droplets having a particle size greater than 70 microns.

13. The method of claim 1, wherein the compositions provide droplets having a particle size greater than 100 microns.

14. The method of claim 1, wherein the sprayer is a low velocity sprayer.

* * * * *